US008213485B2

(12) United States Patent
Odenwalder

(10) Patent No.: US 8,213,485 B2
(45) Date of Patent: **\*Jul. 3, 2012**

(54) HIGH RATE CDMA WIRELESS COMMUNICATION SYSTEM USING VARIABLE SIZED CHANNEL CODES

(75) Inventor: Joseph P. Odenwalder, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/730,510

(22) Filed: Mar. 24, 2010

(65) Prior Publication Data

US 2010/0177744 A1 Jul. 15, 2010

Related U.S. Application Data

(60) Continuation of application No. 10/756,868, filed on Jan. 13, 2004, now Pat. No. 7,715,461, which is a continuation of application No. 09/785,925, filed on Feb. 15, 2001, now Pat. No. 6,678,311, which is a division of application No. 08/856,428, filed on May 14, 1997, now abandoned, which is a continuation-in-part of application No. 08/660,438, filed on Jun. 7, 1996, now Pat. No. 5,926,500, and a continuation-in-part of application No. 08/654,443, filed on May 28, 1996, now Pat. No. 5,930,230.

(51) Int. Cl.
*H04B 1/707* (2006.01)
*H04L 23/02* (2006.01)
*H04J 11/00* (2006.01)

(52) U.S. Cl. .................. 375/146; 375/265; 370/209

(58) Field of Classification Search .................. 375/135, 375/140, 146, 260, 261, 265, 267, 299; 370/208, 370/209, 335, 342
See application file for complete search history.

(56) References Cited

U.S. PATENT DOCUMENTS 2,562,180 A 7/1951 Foley et al.
(Continued)

FOREIGN PATENT DOCUMENTS

CA 2111229 10/1993
(Continued)

OTHER PUBLICATIONS

Aein, J.M., et al., "Multiple Access to a Communications Satellite With Hard-Limiting Repeater," IDS, vol. II, Apr. 1965, 10 pages.

(Continued)

*Primary Examiner* — Young T. Tse
(74) *Attorney, Agent, or Firm* — Qualcomm Patent Group; Larry J. Moskowitz; James H. Yancey, Jr.

(57) ABSTRACT

Method and apparatus for high rate code-division multiple access wireless communication is described. Each of a channel encoded data is modulated by an associated code having a small number of pseudo-noise spreading chips per orthogonal waveform period, thus producing a set of streams of modulated symbols. Each of the set of streams of modulated symbols is then gain adjusted, and combined to yield two streams of combined symbols. The combination is the set of streams is carried out to reduce a peak-to-average ratio of the transmission. The resulting two combined symbol streams are modulated by a complex multiplyer using a user long code and a pseudorandom spreading code (PN code) and upconverted for transmission.

27 Claims, 14 Drawing Sheets

U.S. PATENT DOCUMENTS

| | | |
|---|---|---|
| 3,169,171 A | 2/1965 | Wachs et al. |
| 3,310,631 A | 3/1967 | Brown |
| 3,614,622 A | 10/1971 | Holsinger |
| 3,701,894 A | 10/1972 | Couvillon, Jr. et al. |
| 3,715,508 A | 2/1973 | Blasbalg |
| 3,795,864 A | 3/1974 | Fullton, Jr. |
| 3,809,817 A | 5/1974 | Gill et al. |
| 3,956,589 A | 5/1976 | Weathers et al. |
| 3,956,626 A | 5/1976 | Ross |
| 3,959,726 A | 5/1976 | Hinoshita et al. |
| 4,002,991 A | 1/1977 | Ogita |
| 4,017,798 A | 4/1977 | Gordy et al. |
| 4,020,461 A | 4/1977 | Adams et al. |
| 4,041,391 A | 8/1977 | Deerkoski |
| 4,048,563 A | 9/1977 | Osborne |
| 4,052,565 A | 10/1977 | Baxter et al. |
| 4,092,601 A | 5/1978 | Lee et al. |
| 4,100,376 A | 7/1978 | Woythaler |
| 4,121,159 A | 10/1978 | Lampert |
| 4,152,651 A | 5/1979 | Lampert et al. |
| 4,156,877 A | 5/1979 | Piesinger |
| 4,157,544 A | 6/1979 | Nichols |
| 4,164,628 A | 8/1979 | Ward et al. |
| 4,169,245 A | 9/1979 | Crom et al. |
| 4,179,658 A | 12/1979 | Bitzer |
| 4,188,580 A | 2/1980 | Nicolai et al. |
| 4,189,677 A | 2/1980 | Cooper et al. |
| 4,193,031 A | 3/1980 | Cooper |
| 4,203,070 A | 5/1980 | Bowles et al. |
| 4,203,071 A | 5/1980 | Bowles et al. |
| 4,208,739 A | 6/1980 | Lu et al. |
| 4,217,586 A | 8/1980 | McGuffin |
| 4,222,115 A | 9/1980 | Cooper et al. |
| 4,247,939 A | 1/1981 | Stromswold et al. |
| 4,253,067 A | 2/1981 | Caples et al. |
| 4,276,646 A | 6/1981 | Haggard et al. |
| 4,287,577 A | 9/1981 | Deal, Jr. |
| 4,291,409 A | 9/1981 | Weinberg et al. |
| 4,291,410 A | 9/1981 | Caples et al. |
| 4,301,530 A | 11/1981 | Gutleber |
| 4,308,617 A | 12/1981 | German, Jr. |
| 4,309,769 A | 1/1982 | Taylor, Jr. |
| 4,313,211 A | 1/1982 | Leland |
| 4,361,890 A | 11/1982 | Green, Jr. et al. |
| 4,361,891 A | 11/1982 | Lobenstein et al. |
| 4,365,327 A | 12/1982 | Pirani |
| 4,383,322 A | 5/1983 | Halpern et al. |
| 4,390,898 A | 6/1983 | Bond et al. |
| 4,394,760 A | 7/1983 | Kammerlander |
| 4,398,289 A | 8/1983 | Schoute |
| 4,426,712 A | 1/1984 | Gorski-Popiel |
| 4,434,323 A | 2/1984 | Levine et al. |
| 4,438,511 A | 3/1984 | Baran |
| 4,451,916 A | 5/1984 | Casper et al. |
| 4,453,165 A | 6/1984 | Maine |
| 4,460,992 A | 7/1984 | Gutleber |
| 4,472,815 A | 9/1984 | Gutleber |
| 4,475,208 A | 10/1984 | Ricketts |
| 4,481,640 A | 11/1984 | Chow et al. |
| 4,484,335 A | 11/1984 | Mosley et al. |
| 4,494,238 A | 1/1985 | Groth, Jr. |
| 4,501,002 A | 2/1985 | Auchterlonie |
| 4,512,024 A | 4/1985 | Gutleber |
| 4,518,947 A | 5/1985 | Poston et al. |
| 4,536,875 A | 8/1985 | Kume et al. |
| 4,551,853 A | 11/1985 | Deman et al. |
| 4,559,633 A | 12/1985 | Kan et al. |
| 4,561,089 A | 12/1985 | Rouse et al. |
| 4,567,588 A | 1/1986 | Jerrim |
| 4,578,678 A | 3/1986 | Hurd |
| 4,596,024 A | 6/1986 | Thomson |
| 4,597,087 A | 6/1986 | Kadin |
| 4,601,047 A | 7/1986 | Horwitz et al. |
| 4,607,375 A | 8/1986 | Lee |
| 4,613,860 A | 9/1986 | Currie et al. |
| 4,618,985 A | 10/1986 | Pfeiffer |
| 4,621,365 A | 11/1986 | Chiu |
| 4,630,283 A | 12/1986 | Schiff |
| 4,635,221 A | 1/1987 | Kerr |
| 4,644,560 A | 2/1987 | Torre et al. |
| 4,649,549 A | 3/1987 | Halpern et al. |
| 4,658,436 A | 4/1987 | Hill |
| 4,665,514 A | 5/1987 | Ching et al. |
| 4,669,089 A | 5/1987 | Gahagan et al. |
| 4,672,658 A | 6/1987 | Kavehrad et al. |
| 4,685,106 A | 8/1987 | Miller et al. |
| 4,688,035 A | 8/1987 | Gray et al. |
| 4,696,040 A | 9/1987 | Doddington et al. |
| 4,703,474 A | 10/1987 | Foschini et al. |
| 4,707,839 A | 11/1987 | Andren et al. |
| 4,730,340 A | 3/1988 | Frazier, Jr. |
| 4,744,083 A | 5/1988 | O'Neill et al. |
| 4,754,450 A | 6/1988 | Lynk, Jr. et al. |
| 4,761,796 A | 8/1988 | Dunn et al. |
| 4,785,463 A | 11/1988 | Janc et al. |
| 4,804,938 A | 2/1989 | Rouse et al. |
| 4,809,295 A | 2/1989 | Zscheile, Jr. et al. |
| 4,813,040 A | 3/1989 | Futato |
| 4,821,294 A | 4/1989 | Thomas, Jr. |
| 4,841,544 A | 6/1989 | Nuytkens |
| 4,843,612 A | 6/1989 | Brusch et al. |
| 4,866,732 A | 9/1989 | Carey et al. |
| 4,872,200 A | 10/1989 | Jansen |
| 4,890,283 A | 12/1989 | Tsinberg et al. |
| 4,894,842 A | 1/1990 | Broekhoven et al. |
| 4,901,307 A | 2/1990 | Gilhousen et al. |
| 4,912,721 A | 3/1990 | Pidgeon, Jr. et al. |
| 4,914,699 A | 4/1990 | Dunn et al. |
| 4,926,169 A | 5/1990 | Tong et al. |
| 4,928,106 A | 5/1990 | Ashjaee et al. |
| 4,933,952 A | 6/1990 | Albrieux et al. |
| 4,939,734 A | 7/1990 | Heichler |
| 4,939,745 A | 7/1990 | Kirimoto et al. |
| 4,941,150 A | 7/1990 | Iwasaki |
| 4,942,591 A | 7/1990 | Nease et al. |
| 4,951,150 A | 8/1990 | Browning |
| 4,953,178 A | 8/1990 | Ishigaki |
| 4,958,359 A | 9/1990 | Kato |
| 4,962,507 A | 10/1990 | Renshaw |
| 4,969,159 A | 11/1990 | Belcher et al. |
| 4,979,183 A | 12/1990 | Cowart |
| 4,980,897 A | 12/1990 | Decker et al. |
| 5,003,533 A | 3/1991 | Watanabe |
| 5,005,169 A | 4/1991 | Bronder et al. |
| 5,016,255 A | 5/1991 | Dixon et al. |
| 5,022,046 A | 6/1991 | Morrow, Jr. |
| 5,022,047 A | 6/1991 | Dixon et al. |
| 5,022,049 A | 6/1991 | Abrahamson et al. |
| 5,025,452 A | 6/1991 | Sohner et al. |
| 5,029,147 A | 7/1991 | Andrews et al. |
| 5,029,183 A | 7/1991 | Tymes |
| 5,056,106 A | 10/1991 | Wang et al. |
| 5,056,109 A | 10/1991 | Gilhousen et al. |
| 5,068,849 A | 11/1991 | Tanaka |
| 5,073,900 A | 12/1991 | Mallinckrodt |
| 5,091,940 A | 2/1992 | Clebowicz |
| 5,093,800 A | 3/1992 | Ifune |
| 5,097,485 A | 3/1992 | O'connor et al. |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,113,443 A | 5/1992 | Brockman |
| 5,121,407 A | 6/1992 | Partyka et al. |
| 5,132,986 A | 7/1992 | Endo et al. |
| 5,136,586 A | 8/1992 | Greenblatt |
| 5,150,387 A | 9/1992 | Yoshikawa et al. |
| 5,159,608 A | 10/1992 | Falconer et al. |
| 5,161,168 A | 11/1992 | Schilling |
| 5,173,923 A | 12/1992 | Crespo et al. |
| 5,177,767 A | 1/1993 | Kato |
| 5,199,045 A | 3/1993 | Kato |
| 5,204,876 A | 4/1993 | Bruckert et al. |
| 5,206,881 A | 4/1993 | Messenger et al. |
| 5,212,684 A | 5/1993 | MacNamee et al. |
| 5,212,808 A | 5/1993 | Su et al. |
| 5,218,639 A | 6/1993 | Osterweil |
| 5,237,587 A | 8/1993 | Schoolcraft |

| | | |
|---|---|---|
| 5,243,624 A | 9/1993 | Paik et al. |
| 5,258,983 A | 11/1993 | Lane et al. |
| 5,260,967 A | 11/1993 | Schilling |
| 5,260,969 A | 11/1993 | Kato et al. |
| 5,267,261 A | 11/1993 | Blakeney, II et al. |
| 5,274,675 A | 12/1993 | Granau et al. |
| 5,274,836 A | 12/1993 | Lux |
| 5,280,472 A | 1/1994 | Gilhousen et al. |
| 5,283,780 A | 2/1994 | Schuchman et al. |
| 5,291,515 A | 3/1994 | Uchida et al. |
| 5,309,474 A | 5/1994 | Gilhousen et al. |
| 5,311,194 A | 5/1994 | Brown |
| 5,313,457 A | 5/1994 | Hostetter et al. |
| 5,329,547 A | 7/1994 | Ling |
| 5,335,249 A | 8/1994 | Krueger et al. |
| 5,341,396 A | 8/1994 | Higgins et al. |
| 5,347,546 A | 9/1994 | Abadi et al. |
| 5,365,516 A | 11/1994 | Jandrell |
| 5,365,543 A | 11/1994 | Takahashi et al. |
| 5,373,502 A | 12/1994 | Turban |
| 5,379,320 A | 1/1995 | Fernandes et al. |
| 5,392,223 A | 2/1995 | Caci |
| 5,410,538 A | 4/1995 | Roche et al. |
| 5,410,750 A | 4/1995 | Cantwell et al. |
| 5,412,620 A | 5/1995 | Cafarella et al. |
| 5,412,686 A | 5/1995 | Ling |
| 5,414,728 A * | 5/1995 | Zehavi .......................... 375/142 |
| 5,416,797 A * | 5/1995 | Gilhousen et al. ............ 370/209 |
| 5,418,813 A | 5/1995 | Schaffner et al. |
| 5,420,850 A | 5/1995 | Umeda et al. |
| 5,420,883 A | 5/1995 | Swensen et al. |
| 5,422,909 A | 6/1995 | Love et al. |
| 5,432,815 A | 7/1995 | Kang et al. |
| 5,438,329 A | 8/1995 | Gastouniotis et al. |
| 5,442,625 A | 8/1995 | Gitlin et al. |
| 5,444,575 A | 8/1995 | Augenbraun et al. |
| 5,448,299 A | 9/1995 | Yang et al. |
| 5,454,009 A | 9/1995 | Fruit et al. |
| 5,455,841 A | 10/1995 | Hazu |
| 5,463,656 A | 10/1995 | Polivka et al. |
| 5,465,269 A | 11/1995 | Schaffner et al. |
| 5,465,396 A | 11/1995 | Hunsinger et al. |
| 5,467,367 A | 11/1995 | Izumi et al. |
| 5,469,471 A | 11/1995 | Wheatley, III |
| 5,471,497 A * | 11/1995 | Zehavi .......................... 375/142 |
| 5,471,509 A | 11/1995 | Wood et al. |
| 5,479,168 A | 12/1995 | Johnson et al. |
| 5,485,486 A | 1/1996 | Gilhousen et al. |
| 5,490,165 A | 2/1996 | Blakeney, II et al. |
| 5,497,395 A | 3/1996 | Jou |
| 5,506,865 A | 4/1996 | Weaver, Jr. |
| 5,511,067 A | 4/1996 | Miller |
| 5,511,099 A | 4/1996 | Ko et al. |
| 5,519,526 A | 5/1996 | Chua et al. |
| 5,521,938 A | 5/1996 | Stewart et al. |
| 5,526,291 A | 6/1996 | Lennen |
| 5,526,389 A | 6/1996 | Buell et al. |
| 5,528,624 A | 6/1996 | Kaku et al. |
| 5,533,029 A | 7/1996 | Gardner |
| 5,541,606 A | 7/1996 | Lennen |
| 5,542,054 A | 7/1996 | Batten, Jr. |
| 5,550,809 A | 8/1996 | Bottomley et al. |
| 5,552,772 A | 9/1996 | Janky et al. |
| 5,552,798 A | 9/1996 | Dietrich et al. |
| 5,555,268 A | 9/1996 | Fattouche et al. |
| 5,559,828 A | 9/1996 | Armstrong et al. |
| 5,563,610 A | 10/1996 | Reudink |
| 5,566,164 A * | 10/1996 | Ohlson .......................... 370/320 |
| 5,566,165 A | 10/1996 | Sawahashi et al. |
| 5,568,119 A | 10/1996 | Schipper et al. |
| 5,570,351 A | 10/1996 | Wornell |
| 5,570,388 A | 10/1996 | Halpern |
| 5,577,022 A | 11/1996 | Padovani et al. |
| 5,577,025 A | 11/1996 | Skinner et al. |
| 5,577,066 A | 11/1996 | Schuchman et al. |
| 5,579,014 A | 11/1996 | Brooksby et al. |
| 5,579,124 A | 11/1996 | Aijala et al. |
| 5,581,575 A | 12/1996 | Zehavi et al. |
| 5,586,266 A | 12/1996 | Hershey et al. |
| 5,590,160 A | 12/1996 | Ostman |
| 5,592,481 A | 1/1997 | Wiedeman et al. |
| 5,596,570 A | 1/1997 | Soliman |
| 5,596,659 A | 1/1997 | Normile et al. |
| 5,602,833 A | 2/1997 | Zehavi |
| 5,603,081 A | 2/1997 | Raith et al. |
| 5,603,096 A | 2/1997 | Gilhousen et al. |
| 5,604,730 A | 2/1997 | Tiedemann, Jr. |
| 5,608,722 A | 3/1997 | Miller |
| 5,610,940 A | 3/1997 | Durrant et al. |
| 5,612,956 A | 3/1997 | Walker et al. |
| 5,614,914 A | 3/1997 | Bolgiano et al. |
| 5,619,524 A | 4/1997 | Ling et al. |
| 5,619,526 A | 4/1997 | Kim et al. |
| 5,621,723 A | 4/1997 | Walton, Jr. et al. |
| 5,621,752 A | 4/1997 | Antonio et al. |
| 5,623,485 A * | 4/1997 | Bi .................. 370/209 |
| 5,625,642 A | 4/1997 | Wornell |
| 5,625,876 A | 4/1997 | Gilhousen et al. |
| 5,634,190 A | 5/1997 | Wiedeman |
| 5,636,292 A | 6/1997 | Rhoads |
| 5,640,386 A | 6/1997 | Wiedeman |
| 5,642,397 A | 6/1997 | Agbaje-Anozie |
| 5,644,590 A | 7/1997 | Sugita |
| 5,649,030 A | 7/1997 | Normile et al. |
| 5,649,296 A | 7/1997 | MacLellan et al. |
| 5,654,979 A | 8/1997 | Levin et al. |
| 5,657,947 A | 8/1997 | Mayersak |
| 5,659,573 A | 8/1997 | Bruckert et al. |
| 5,663,735 A | 9/1997 | Eshenbach |
| 5,664,006 A | 9/1997 | Monte et al. |
| 5,671,226 A | 9/1997 | Murakami et al. |
| 5,673,259 A | 9/1997 | Quick, Jr. |
| 5,675,344 A | 10/1997 | Tong et al. |
| 5,675,581 A | 10/1997 | Soliman |
| 5,677,927 A | 10/1997 | Fullerton et al. |
| 5,682,376 A | 10/1997 | Hayashino et al. |
| 5,683,432 A | 11/1997 | Goedeke et al. |
| 5,687,191 A | 11/1997 | Lee et al. |
| 5,689,511 A | 11/1997 | Shimazaki et al. |
| 5,691,974 A | 11/1997 | Zehavi et al. |
| 5,694,417 A | 12/1997 | Andren et al. |
| 5,696,766 A | 12/1997 | Yeung et al. |
| 5,696,789 A | 12/1997 | Jones et al. |
| 5,699,380 A | 12/1997 | Sugita |
| 5,703,793 A | 12/1997 | Wise et al. |
| 5,703,902 A | 12/1997 | Ziv et al. |
| 5,710,768 A | 1/1998 | Ziv et al. |
| 5,710,784 A | 1/1998 | Kindred et al. |
| 5,712,863 A | 1/1998 | Gray |
| 5,712,869 A | 1/1998 | Lee et al. |
| 5,712,870 A | 1/1998 | Petrick |
| 5,712,915 A | 1/1998 | Onufry, Jr. |
| 5,713,075 A | 1/1998 | Threadgill et al. |
| 5,715,526 A | 2/1998 | Weaver, Jr. et al. |
| 5,717,830 A | 2/1998 | Sigler et al. |
| 5,719,899 A | 2/1998 | Thielecke et al. |
| 5,719,937 A | 2/1998 | Warren et al. |
| 5,724,340 A | 3/1998 | Jones et al. |
| 5,724,383 A | 3/1998 | Gold et al. |
| 5,724,385 A | 3/1998 | Levin et al. |
| 5,726,658 A | 3/1998 | Auslander et al. |
| 5,727,064 A | 3/1998 | Reeds, III |
| 5,729,570 A * | 3/1998 | Magill .......................... 375/149 |
| 5,729,607 A | 3/1998 | DeFries et al. |
| 5,731,786 A | 3/1998 | Abraham et al. |
| 5,732,113 A | 3/1998 | Schmidl et al. |
| 5,737,326 A | 4/1998 | I et al. |
| 5,742,595 A | 4/1998 | Bhagalia |
| 5,745,525 A | 4/1998 | Hunsinger et al. |
| 5,748,677 A | 5/1998 | Kumar |
| 5,751,761 A | 5/1998 | Gilhousen |
| 5,757,766 A * | 5/1998 | Sugita .......................... 370/206 |
| 5,757,767 A | 5/1998 | Zehavi |
| 5,757,858 A | 5/1998 | Black et al. |
| 5,768,307 A | 6/1998 | Schramm et al. |
| 5,769,032 A | 6/1998 | Yarnall, Sr. et al. |
| 5,771,229 A | 6/1998 | Gavrilovich |
| 5,771,239 A | 6/1998 | Moroney et al. |

| | | | | | | |
|---|---|---|---|---|---|---|
| 5,774,452 A | 6/1998 | Wolosewicz | | 6,078,284 A | 6/2000 | Levanon |
| 5,777,990 A | 7/1998 | Zehavi et al. | | 6,078,573 A | 6/2000 | Batalama et al. |
| 5,781,184 A | 7/1998 | Wasserman et al. | | 6,101,176 A | 8/2000 | Honkasalo et al. |
| 5,781,541 A | 7/1998 | Schneider | | 6,104,968 A | 8/2000 | Ananth |
| 5,781,583 A | 7/1998 | Bruckert et al. | | 6,107,959 A | 8/2000 | Levanon |
| 5,784,339 A | 7/1998 | Woodsum et al. | | 6,108,317 A | 8/2000 | Jones et al. |
| 5,784,392 A | 7/1998 | Czaja et al. | | 6,108,364 A | 8/2000 | Weaver, Jr. et al. |
| 5,784,402 A | 7/1998 | Feher | | 6,130,602 A | 10/2000 | O'Toole et al. |
| 5,784,403 A | 7/1998 | Scott | | 6,147,964 A | 11/2000 | Black et al. |
| 5,796,716 A | 8/1998 | Smith | | 6,173,007 B1 | 1/2001 | Odenwalder et al. |
| 5,796,776 A | 8/1998 | Lomp et al. | | 6,185,246 B1 | 2/2001 | Gilhousen |
| 5,798,732 A | 8/1998 | Eshenbach | | 6,192,068 B1 | 2/2001 | Fattouche et al. |
| 5,799,010 A | 8/1998 | Lomp et al. | | 6,205,190 B1 | 3/2001 | Antonio et al. |
| 5,799,011 A | 8/1998 | LaRosa et al. | | 6,222,828 B1 | 4/2001 | Ohlson et al. |
| 5,802,445 A | 9/1998 | Wiedeman et al. | | 6,243,772 B1 | 6/2001 | Ghori et al. |
| 5,805,567 A | 9/1998 | Ramesh | | 6,252,962 B1 | 6/2001 | Sagey |
| 5,805,634 A | 9/1998 | Sumner | | 6,269,088 B1 * | 7/2001 | Masui et al. .................. 370/335 |
| 5,809,060 A | 9/1998 | Cafarella et al. | | 6,282,228 B1 | 8/2001 | Monroe |
| 5,812,522 A | 9/1998 | Lee et al. | | 6,282,714 B1 | 8/2001 | Ghori et al. |
| 5,812,543 A | 9/1998 | Sugita | | 6,292,477 B1 | 9/2001 | Ohgoshi et al. |
| 5,812,558 A | 9/1998 | Rotz et al. | | 6,298,051 B1 | 10/2001 | Odenwalder et al. |
| 5,812,607 A | 9/1998 | Hutchinson, IV et al. | | 6,300,880 B1 | 10/2001 | Sitnik |
| 5,812,613 A | 9/1998 | Zogg | | 6,308,072 B1 | 10/2001 | Labedz et al. |
| 5,815,488 A | 9/1998 | Williams et al. | | 6,327,534 B1 | 12/2001 | Levanon et al. |
| 5,822,359 A | 10/1998 | Bruckert et al. | | 6,335,922 B1 | 1/2002 | Tiedemann, Jr. et al. |
| 5,822,360 A | 10/1998 | Lee et al. | | 6,356,555 B1 | 3/2002 | Rakib et al. |
| 5,832,022 A | 11/1998 | Scott | | 6,363,102 B1 | 3/2002 | Ling et al. |
| 5,832,024 A | 11/1998 | Schotz et al. | | 6,400,393 B1 | 6/2002 | Limberg |
| 5,838,799 A | 11/1998 | Cioffi et al. | | 6,473,447 B1 | 10/2002 | Strich et al. |
| 5,839,052 A | 11/1998 | Dean et al. | | 6,480,521 B1 | 11/2002 | Odenwalder et al. |
| 5,841,807 A | 11/1998 | Hannebauer et al. | | RE38,603 E | 9/2004 | Kim et al. |
| 5,844,885 A | 12/1998 | Grob et al. | | 6,798,736 B1 * | 9/2004 | Black et al. .................. 370/208 |
| 5,850,187 A | 12/1998 | Carrender et al. | | 2001/0026578 A1 | 10/2001 | Ando |
| 5,867,109 A | 2/1999 | Wiedeman | | | | |
| 5,867,411 A | 2/1999 | Kumar | | FOREIGN PATENT DOCUMENTS | | |
| 5,867,763 A | 2/1999 | Dean et al. | | EP | 0036605 A1 | 9/1981 |
| 5,870,378 A | 2/1999 | Huang et al. | | EP | 0041253 | 12/1981 |
| 5,870,431 A | 2/1999 | Easton et al. | | EP | 0050478 | 4/1982 |
| 5,872,481 A | 2/1999 | Sevic et al. | | EP | 0111937 A2 | 6/1984 |
| 5,881,056 A | 3/1999 | Huang et al. | | EP | 0216974 | 4/1987 |
| 5,883,899 A | 3/1999 | Dahlman et al. | | EP | 0264784 A2 | 4/1988 |
| 5,884,187 A | 3/1999 | Ziv et al. | | EP | 0366086 | 5/1990 |
| 5,889,868 A | 3/1999 | Moskowitz et al. | | EP | 0405384 | 1/1991 |
| 5,892,774 A | 4/1999 | Zehavi et al. | | EP | 0412583 A2 | 2/1991 |
| 5,896,368 A * | 4/1999 | Dahlman et al. .............. 370/335 | | EP | 0418865 A2 | 3/1991 |
| 5,896,374 A | 4/1999 | Okumura et al. | | EP | 0444592 A2 | 9/1991 |
| 5,901,183 A | 5/1999 | Garin et al. | | EP | 0496717 | 7/1992 |
| 5,903,554 A | 5/1999 | Saints | | EP | 0563020 | 9/1993 |
| 5,903,555 A | 5/1999 | Wildauer et al. | | EP | 0566550 A2 | 10/1993 |
| 5,909,462 A | 6/1999 | Kamerman et al. | | EP | 0615355 A2 | 9/1994 |
| 5,911,119 A | 6/1999 | Bartholomew et al. | | EP | 0620658 A1 | 10/1994 |
| 5,913,164 A | 6/1999 | Pawa et al. | | EP | 0639899 A1 | 2/1995 |
| 5,914,950 A * | 6/1999 | Tiedemann et al. ......... 370/348 | | EP | 0679031 | 10/1995 |
| 5,915,027 A | 6/1999 | Cox et al. | | EP | 0681376 | 11/1995 |
| 5,920,551 A | 7/1999 | Na et al. | | EP | 0693830 A2 | 1/1996 |
| 5,920,552 A | 7/1999 | Allpress et al. | | EP | 0729241 A2 | 8/1996 |
| 5,926,500 A | 7/1999 | Odenwalder | | EP | 0758168 A1 | 2/1997 |
| 5,930,230 A | 7/1999 | Odenwalder et al. | | EP | 838105 | 4/1998 |
| 5,930,706 A | 7/1999 | Raith | | EP | 0903871 A2 | 3/1999 |
| 5,933,421 A | 8/1999 | Alamouti et al. | | GB | 7918781 | 12/1979 |
| 5,940,429 A | 8/1999 | Lam et al. | | GB | 2125654 A | 3/1984 |
| 5,943,329 A | 8/1999 | Ohgoshi et al. | | GB | 2182528 A | 5/1987 |
| 5,945,944 A | 8/1999 | Krasner | | JP | 04018862 | 1/1992 |
| 5,949,814 A | 9/1999 | Odenwalder et al. | | JP | 06501349 | 2/1994 |
| 5,950,131 A | 9/1999 | Vilmur | | JP | 9008770 A | 1/1997 |
| 5,953,367 A | 9/1999 | Zhodzicshsky et al. | | JP | 0983600 | 3/1997 |
| 5,960,032 A | 9/1999 | Letaief et al. | | JP | 2000511721 | 9/2000 |
| 5,960,040 A | 9/1999 | Cai et al. | | RU | 2050695 | 12/1995 |
| 5,970,058 A | 10/1999 | DeClerk et al. | | RU | 2313176 | 12/2007 |
| 5,987,326 A | 11/1999 | Tiedemann, Jr. et al. | | SU | 1053302 | 11/1983 |
| 5,991,284 A | 11/1999 | Willenegger et al. | | SU | 1327217 | 7/1987 |
| 5,995,556 A | 11/1999 | Thomas, Jr. | | WO | WO8503180 A1 | 7/1985 |
| 5,999,816 A | 12/1999 | Tiedemann, Jr. et al. | | WO | WO8505745 | 12/1985 |
| 6,021,309 A | 2/2000 | Sherman et al. | | WO | WO8700370 A1 | 1/1987 |
| 6,025,944 A | 2/2000 | Mendez et al. | | WO | WO8806387 A1 | 8/1988 |
| 6,044,083 A | 3/2000 | Citta et al. | | WO | WO9013186 A1 | 11/1990 |
| 6,067,292 A * | 5/2000 | Huang et al. .................. 370/342 | | WO | WO9107030 A1 | 5/1991 |
| 6,069,914 A | 5/2000 | Cox | | WO | WO9200639 | 1/1992 |
| 6,072,778 A | 6/2000 | Labedz et al. | | WO | WO9215073 A1 | 9/1992 |

| | | |
|---|---|---|
| WO | WO9217011 A1 | 10/1992 |
| WO | WO9217012 A1 | 10/1992 |
| WO | WO9315573 A1 | 8/1993 |
| WO | WO9503652 A1 | 2/1995 |
| WO | WO9506987 A1 | 3/1995 |
| WO | WO9512262 A1 | 5/1995 |
| WO | WO9512943 A1 | 5/1995 |
| WO | WO9523464 | 8/1995 |
| WO | WO9533311 | 12/1995 |
| WO | WO9600466 | 1/1996 |
| WO | WO9602987 | 2/1996 |
| WO | WO9606490 | 2/1996 |
| WO | WO9621305 | 7/1996 |
| WO | WO9622639 A1 | 7/1996 |
| WO | WO9626582 A1 | 8/1996 |
| WO | WO9632781 | 10/1996 |
| WO | WO9642174 A1 | 12/1996 |
| WO | WO9701227 | 1/1997 |
| WO | WO9705717 | 2/1997 |
| WO | WO9724818 A1 | 7/1997 |
| WO | WO9737471 A1 | 10/1997 |
| WO | WO9745970 A1 | 12/1997 |
| WO | WO9747098 A1 | 12/1997 |

OTHER PUBLICATIONS

Alavi, H., Power Control and Interference Management in a Spread-Spectrum Cellular Mobile Radio System, U-M-I Dissertation Information Service, 1984.

Besslich, Philip W., "Sequential Circuits and Walsh Functions," Applications of Walsh Functions, 1974, pp. 154-157.

Bobwetter, Von Claus, "Die Erzeugung Von Walsh-Funktionen," NZT, 1970, pp. 201-207.

Cooper, George R., et al., "A Spread-Spectrum Technique for High-Capacity Mobile Communications," IEEE Transaction on Vehicular Technology, vol. VT-27, No. 4, Nov. 1978. 12 Pages.

Cooper, G.R. et al., Cellular Mobile Technology: The Great Multiplier, IEEE Spectrum Advanced Technology 1983 pp. 30-37.

Cooper, G.R., et al. A Spread Spectrum Technique for High Capacity Mobile Communication, School of Electrical Engineering, Purdue University, West Lafayette, Indiana, Record of the IEEE Conference of Vehicular Technology Mar. 16-18, 1977 pp. 98-103.

Cooper, G.R. et al. Cellular Land-Mobile Radio: Why Spread Spectrum IEEE Communications Magazine Mar. 1979 pp. 17-24, 278-285.

Frenger, P., et al. "Rate matching in multichannel systems using RCPC codes" Vehicular Technology Conference, 1997, IEEE 47th Phoenix, AZ, May 1997, New York, IEEE May 4, 1997, pp. 354-357.

Golomb, Solomon W., "Shift Register Sequences" Holden-Day, Inc., 1967, pp. 192-197.

"GSM Has Problems Which Are Now Attracting Attention Around the World. Will Action Be Taken to Resolve Them?" Australian Communications, Jul. 1993, 8 pages.

Hottinen, A. et al. "A Flexible Multirate CDMA concept with multiuser detection" Spread Spectrum Techniques and Applications Proceedings, 1996, IEEE 4th International Symposium on Mainz, Germany 1996, New York, IEEE vol. 2, Sep. 22, 1996, pp. 556-560.

Kahn, L.R., Ratio Squarer, I-R-E, Nov. 1954, pp. 1704.

Kreyszig, Erwin, "Orthogonal Sets of Functions/Chapter 4," Advanced Engineering Mathematics, p. 186-190, John Wiley & Sons, Inc. 1979.

Lebert, Frederick J., "Walsh Function Generator for a Million Different Functions," Applications of Walsh Functions, 1970, pp. 52-54.

Lee, Bong Woon, et al., "On Interference Suppression Using Complementary Filters in DS-DSS," IEEE, vol. 2, 1989, pp. 0486-0490.

Machrone, Bill "America's Telecommunications Industry is Teetering on the Brink. The FCC Has Auctioned Off Billions of Dollars' Worth of Radion Spectrum for the Industry to Offer New Wirless Services, Called PS (Personal Communications Services). The Winners Must." Jul. 1995. p. 85.

Nettleton, R.W., Spectral Efficiency in Cellular Land-Mobile Communications: A Spread-Spectrum Approach, U-M-I Dissertation Information Service 1978.

Nick, H.H., "Binary Logic Walsh Function Generator," IBM Technical Disclosure Bulletin, vol. 22 No. 10, Mar. 1980, pp. 4650-4651.

Ohno, Wideband Coherent DS-CDMA et al pp. 779-783, IEEE 1995.

Rechtin, E., "An Annotated History of Codorac: 1953-1958," Jet Propulsion Laboratory, Jul. 9, 1981, Report No. 20-120, pp. 1-22.

Reilly, Arthur K., et al., "W-CDMA Air Interface Compatibility Standard for 1.85 to 1.99 GHz PCS Applications," Joint Technical Committee, Feb. 2, 1995, pp. 1-733.

Scarbata, G., Realisierung Von Walsh-Funktionsgeneratoren, Radio Fernsehen Elektronik 1978, pp. 117-119.

Scarbata, G., Walshfunktionen-Generator, Radio Fernsehen Elektronik 1973, pp. 470-474.

Scarbata, George "Walsh-Funkionen Und Ihre Erzeugung," Nachrichtentechnik-Elektronik, 1976, pp. 111-116.

Simon, Marvin K., et al., "Spread Spectrum Communications," Computer Science Press, vol. I, 1985, pp. 98-104.

Viterbi, A., et al., Nonlinear Estimation of PSK-Modulated Carrier Phase with Application to Burst Digital Transmission, IEEE Transaction on Information Theory, vol. IT-29, No. 4 Jul. 1983 pp. 543-551.

Westman, T., et al., "CDMA system for UMTS high bit rate services" Vehicular Technology Conference, 1997, IEEE 47th Phoenix, AZ, May 1997 New York, NY, IEEE, US. vol. 2, May 4, 1997, pp. 825-829.

Karr, Albrat R., et al., "Digital Phones Cause Problems in Hearing Aids," The Wall Street Journal, 2 pages, Mar. 12, 1996.

Roddam, Thomas, "Walsh-Functions, Generation and Application," 3 pages, Mar. 27, 2001.

Lee, "Digital Generation of Walsh-Functions for Orthogonal Multiplexing Applications", Applicants of Walsh Functions, Dept of Electrical Eng, The Catholic University f America, Washington, DC and Consultant, US Naval Research Lab, Washington, DC, pp. 222-227, Apr. 1973.

* cited by examiner

HIGH RATE CDMA WIRELESS COMMUNICATION SYSTEM USING VARIABLE SIZED CHANNEL CODES

This application is a continuation of U.S. application Ser. No. 10/756,868, filed Jan. 13, 2004, now U.S. Pat. No. 7,715,461, which is a continuation of an U.S. application Ser. No. 09/785,925, filed Feb. 15, 2001, now U.S. Pat. No. 6,678,311, which is a divisional of U.S. application Ser. No. 08/856,428, filed May 14, 1997, now abandoned, which is a continuation in part of U.S. application Ser. No. 08/660,438, entitled "REDUCED PEAK-TO-AVERAGE TRANSMIT POWER HIGH DATA RATE CDMA WIRELESS COMMUNICATION SYSTEM" filed Jun. 7, 1996, now U.S. Pat. No. 5,926,500, issued Jul. 20, 1999 to Odenwalder, and a continuation in part of U.S. application Ser. No. 08/654,443, entitled "HIGH DATA RATE CDMA WIRELESS COMMUNICATION SYSTEM" filed May 28, 1996, now U.S. Pat. No. 5,930,230, all assigned to the assignee of the present invention.

BACKGROUND OF THE INVENTION

I. Field of the Invention

The present invention relates to communications. More particularly, the present invention relates to a novel and improved method and apparatus for high data rate CDMA wireless communication.

II. Description of the Related Art

Wireless communication systems including cellular, satellite and point-to-point communication systems use a wireless link comprised of a modulated radio frequency (RF) signal to transmit data between two systems. The use of a wireless link is desirable for a variety of reasons including increased mobility and reduced infrastructure requirements when compared to wire line communication systems. One drawback of using a wireless link is the limited amount of communication capacity that results from the limited amount of available RF bandwidth. This limited communication capacity is in contrast to wire based communication systems where additional capacity can be added by installing additional wire line connections.

Recognizing the limited nature of RF bandwidth, various signal processing techniques have been developed for increasing the efficiency with which wireless communication systems utilize the available RF bandwidth. One widely accepted example of such a bandwidth-efficient signal processing technique is the IS-95 over the air interface standard and its derivatives such as IS-95-A and ANSI J-STD-008 (referred to hereafter collectively as the IS-95 standard) promulgated by the telecommunication industry association (TIA) and used primarily within cellular telecommunications systems. The IS-95 standard incorporates code division multiple access (CDMA) signal modulation techniques to conduct multiple communications simultaneously over the same RF bandwidth. When combined with comprehensive power control, conducting multiple communications over the same bandwidth increases the total number of calls and other communications that can be conducted in a wireless communication system by, among other things, increasing the frequency reuse in comparison to other wireless telecommunication technologies. The use of CDMA techniques in a multiple access communication system is disclosed in U.S. Pat. No. 4,901,307, entitled "Spread Spectrum Communication System Using Satellite or Terrestrial Repeaters," and U.S. Pat. No. 5,103,459, entitled "System and Method for Generating Signal Waveforms in a CDMA Cellular Telephone System," both of which are assigned to the assignee of the present invention and incorporated by reference herein.

FIG. 1 provides a highly simplified illustration of a cellular telephone system configured in accordance with the use of the IS-95 standard. During operation, a set of subscriber units 10*a-d* conduct wireless communication by establishing one or more RF interfaces with one or more base stations 12*a-d* using CDMA-modulated RF signals. Each RF interface between a base station 12 and a subscriber unit 10 is comprised of a forward link signal transmitted from the base station 12, and a reverse link signal transmitted from the subscriber unit. Using these RF interfaces, a communication with another user is generally conducted by way of mobile telephone switching office (MTSO) 14 and public switch telephone network (PSTN) 16. The links between base stations 12, MTSO 14 and PSTN 16 are usually formed via wire line connections, although In accordance with the IS-95 standard each subscriber unit 10 transmits user data via a single channel, non-coherent, reverse link signal at a maximum data rate of 9.6 or 14.4 kbits/sec depending on which rate set from a set of rate sets is selected. A non-coherent link is one in which phase information is not utilized by the received system. A coherent link is one in which the receiver exploits knowledge of the carrier signals phase during processing. The phase information typically takes the form of a pilot signal, but can also be estimated from the data transmitted. The IS-95 standard calls for a set of sixty-four Walsh codes, each comprised of sixty-four chips, to be used for the forward link.

The use of a single channel, non-coherent, reverse link signal having a maximum data rate of 9.6 of 14.4 kbits/sec as specified by IS-95 is well suited for a wireless cellular telephone system in which the typical communication involves the transmission of digitized voice or lower rate digital data, such as a facsimile. A non-coherent reverse link was selected because, in a system in which up to 80 subscriber units 10 may communicate with a base station 12 for each 1.2288 MHz of bandwidth allocated, providing the necessary pilot data in the transmission from each subscriber unit 10 would substantially increase the degree to which a set of subscriber units 10 interfere with one another. Also, at data rates of 9.6 or 14.4 kbits/sec, the ratio of the transmit power of any pilot data to the user data would be significant, and therefore also increase inter-subscriber unit interference. The use of a single channel reverse link signal was chosen because engaging in only one type of communication at a time is consistent with the use of wireline telephones, the paradigm on which current wireless cellular communications is based. Also, the complexity of processing a single channel is less than that associated with processing multiple channels.

As digital communications progress, the demand for wireless transmission of data for applications such as interactive file browsing and video teleconferencing is anticipated to increase substantially. This increase will transform the way in which wireless communications systems are used, and the conditions under which the associated RF interfaces are conducted. In particular, data will be transmitted at higher maximum rates and with a greater variety of possible rates. Also, more reliable transmission may become necessary as errors in the transmission of data are less tolerable than errors in the transmission of audio information. Additionally, the increased number of data types will create a need to transmit multiple types of data simultaneously. For example, it may be necessary to exchange a data file while maintaining an audio or video interface. Also, as the rate of transmission from a subscriber unit increases, the number of subscriber units 10 communicating with a base station 12 per amount of RF bandwidth will decrease, as the higher data transmission rates will cause the data processing capacity of the base station to be reached with fewer subscriber units 10. In some instances, the current IS-95 reverse link may not be ideally suited for all these changes. Therefore, the present invention is related to providing a higher data rate, bandwidth efficient CDMA interface over which multiple types of communication can be performed.

SUMMARY OF THE INVENTION

A novel and improved method and apparatus for high rate CDMA wireless communication is described. In accordance with one embodiment of the invention, a set of individually gain-adjusted subscriber channels are formed via the use of a set of orthogonal subchannel codes having a small number of PN spreading chips per orthogonal waveform period. Data to be transmitted via one of the transmit channels is low code rate error correction-encoded and sequence-repeated before being modulated with one of the subchannel codes, gain-adjusted, and summed with data modulated using the other subchannel codes. The resulting summed data is modulated using a user long code and a pseudorandom spreading code (PN code) and upconverted for transmission. The use of the short orthogonal codes provides interference suppression while still allowing extensive error correction coding and repetition for time diversity to overcome the Raleigh fading commonly experienced in terrestrial wireless systems. In the exemplary embodiment of the invention provided, the set of sub-channel codes are comprised of four Walsh codes, each orthogonal to the remaining set and four chips in duration. The use of a small number (e.g. four) sub-channels is preferred as it allows shorter orthogonal codes to be used. However, the use of a greater number of channels and therefore longer codes is consistent with the invention. In another embodiment of the invention the length, or number of chips, in each channel code is different to further reduced the peak-to-average transmit power.

In a preferred exemplary embodiment of the invention, pilot data is transmitted via a first one of the transmit channels and power control data transmitted via a second transmit channel. The remaining two transmit channels are used for transmitting non-specified digital data including user data or signaling data, or both. In an exemplary embodiment, one of the two non-specified transmit channels is configured for BPSK modulation and transmission over the quadrature channel.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A novel and improved method and apparatus for high rate CDMA wireless communication is described in the context of the reverse link transmission portion of a cellular telecommunications system. While the invention is particularly adapted for use within the multipoint-to-point reverse link transmission of a cellular telephone system, the present invention is equally applicable to forward link transmissions. In addition, many other wireless communication systems will benefit by incorporation of the invention, including satellite based wireless communication systems, point-to-point wireless communication systems, and systems transmitting radio frequency signals via the use of co-axial or other broadband cables.

Figure 1:
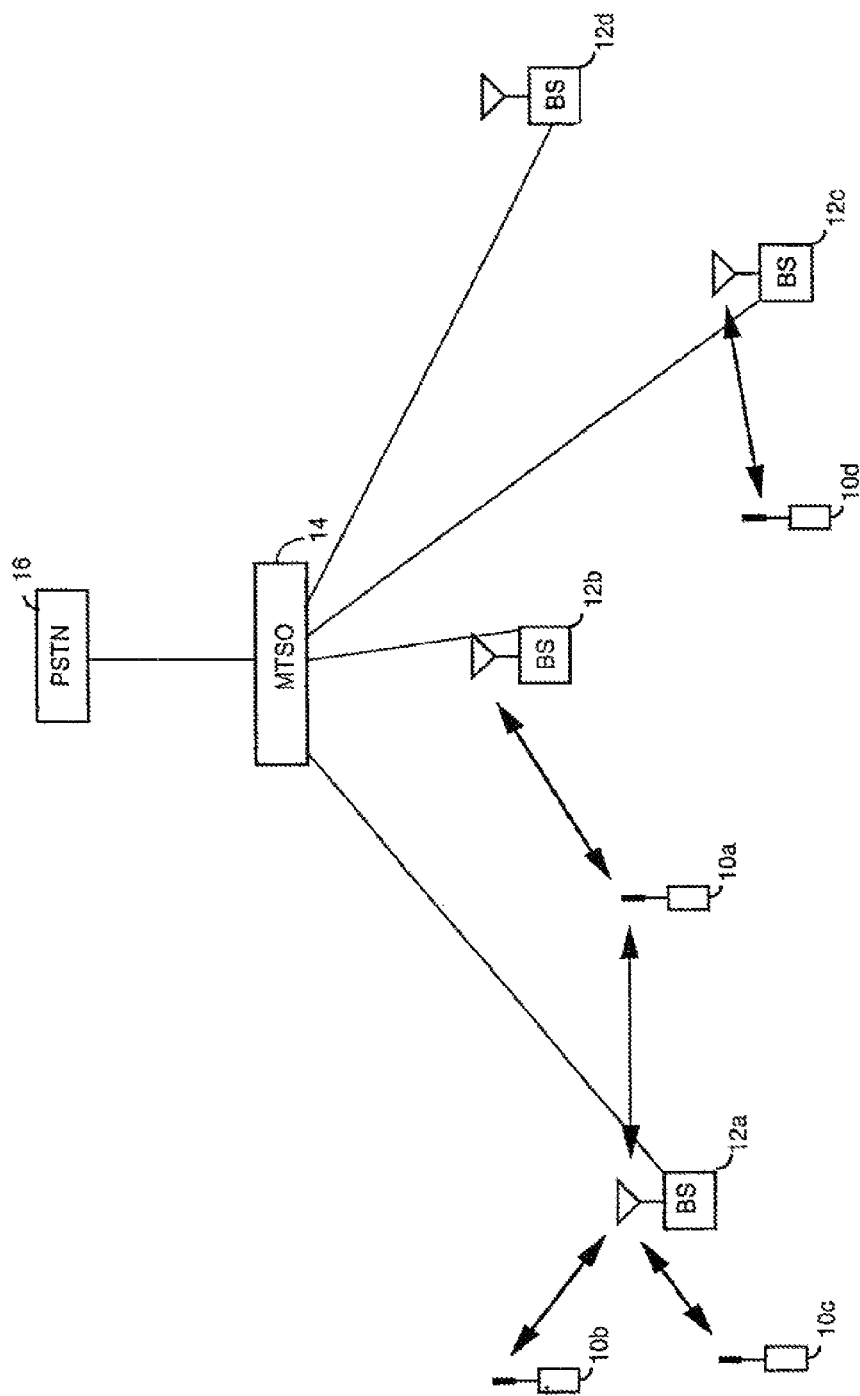
FIG. 1 is a block diagram of cellular telephone system.
Figure 2:
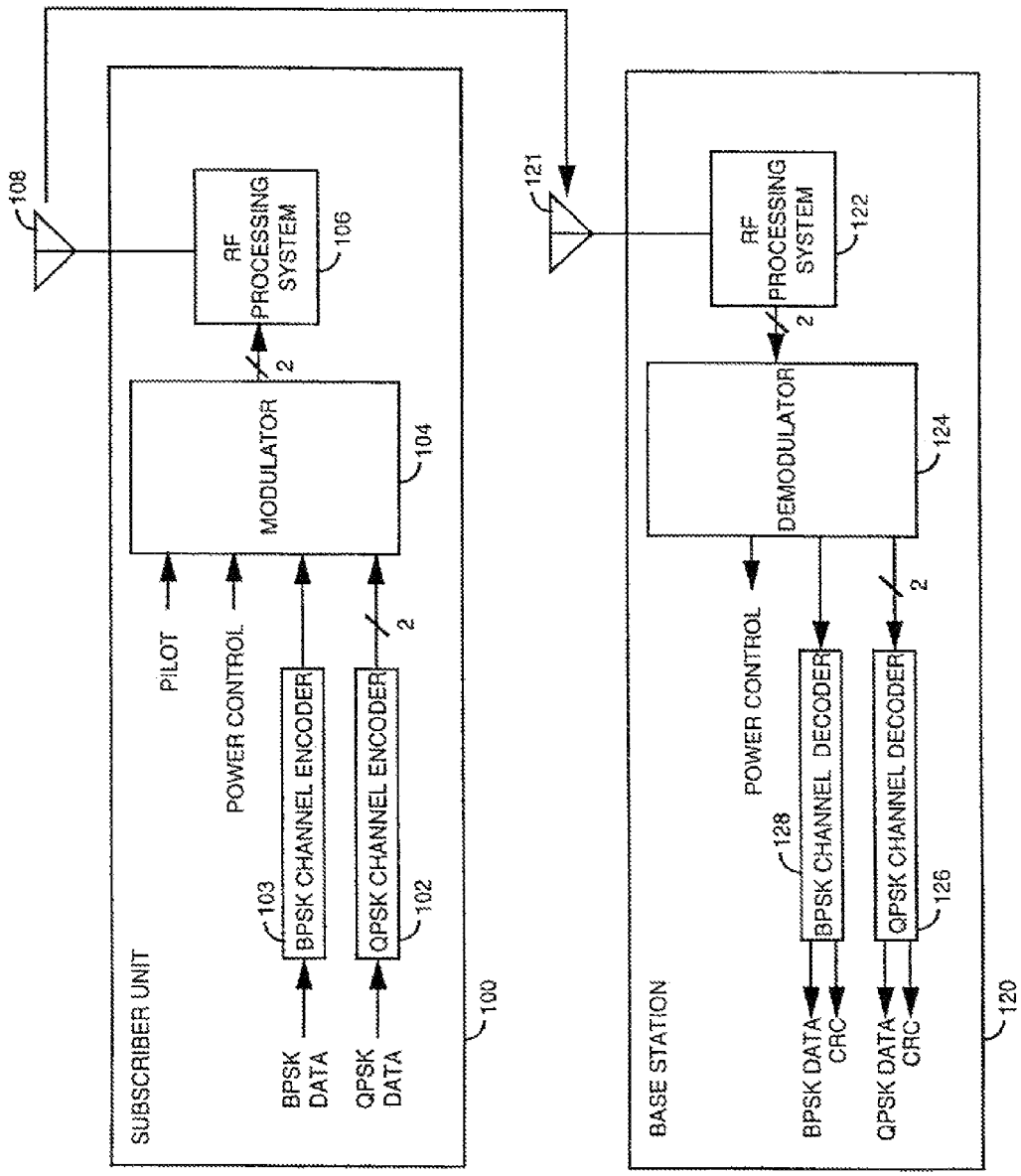
FIG. 2 is a block diagram of a subscriber unit and base station configured in accordance with the exemplary embodiment of the invention.

FIG. 2 is a block diagram of receive and transmit systems configured as a subscriber unit 100 and a base station 120 in accordance with one embodiment of the invention. A first set of data (BPSK data) is received by BPSK channel encoder 103, which generates a code symbol stream configured for performing BPSK modulation that is received by modulator 104. A second set of data (QPSK data) is received by QPSK channel encoder 102, which generates a code symbol stream configured for performing QPSK modulation that is also received by modulator 104. Modulator 104 also receives power control data and pilot data, which are modulated along with the BPSK and QPSK encoded data in accordance with code division multiple access (CDMA) techniques to generate a set of modulation symbols received by RF processing system 106. RF processing system 106 filters and upconverts the set of modulation symbols to a carrier frequency for transmission to the base station 120 using antenna 108. While only one subscriber unit 100 is shown, multiple subscriber units communicate with base station 120 in the preferred embodiment.

Within base station 120, RF processing system 122 receives the transmitted RF signals by way of antenna 121 and performs bandpass filtering, downconversion to baseband, and digitization. Demodulator 124 receives the digitized signals and performs demodulation in accordance with CDMA techniques to produce power control, BPSK, and QPSK soft decision data. BPSK channel decoder 128 decodes the BPSK soft decision data received from demodulator 124 to yield a best estimate of the BPSK data, and QPSK channel decoder 126 decodes the QPSK soft decision data received by demodulator 124 to produce a best estimate of the QPSK data. The best estimate of first and second set of data is then available for further processing or forwarding to a next destination, and the received power control data used either directly, or after decoding, to adjust the transmit power of the forward link channel used to transmit data to subscriber unit 100.

Figure 3:
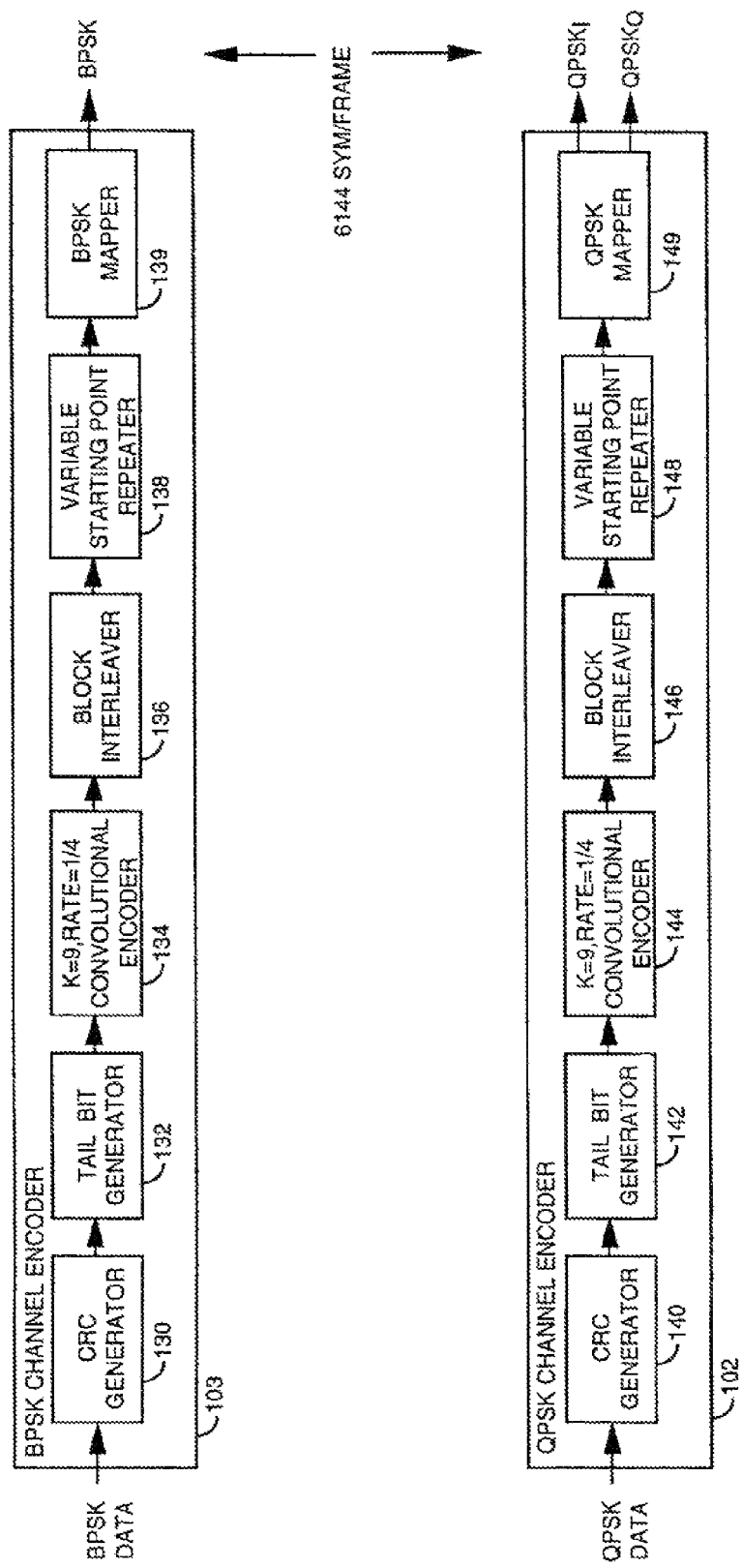
FIG. 3 is a block diagram of a BPSK channel encoder and a QPSK channel encoder configured in accordance with the exemplary embodiment of the invention.

FIG. 3 is a block diagram of BPSK channel encoder 103 and QPSK channel encoder 102 when configured in accordance with the exemplary embodiment of the invention. Within BPSK channel encoder 103 the BPSK data is received by CRC check sum generator 130 which generates a check sum for each 20-ms frame of the first set of data. The frame of data along with the CRC check sum is received by tail bit generator 132 which appends tail bits comprised of eight logic zeros at the end of each frame to provide a known state at the end of the decoding process. The frame including the code tail bits and CRC check sum is then received by convolutional encoder 134 which performs, constraint length (K) 9, rate (R) ¼ convolutional encoding thereby generating code symbols at a rate four times the encoder input rate ($E_R$). In the alternative embodiment of the invention, other encoding rates are performed including rate ½, but the use of rate ¼ is preferred due to its optimal complexity-performance characteristics. Block interleaver 136 performs bit interleaving on the code symbols to provide time diversity for more reliable transmission in fast fading environments. The resulting interleaved symbols are received by variable starting point repeater 138, which repeats the interleaved symbol sequence a sufficient number of times $N_R$ to provide a constant rate symbol stream, which corresponds to outputting frames having a constant number of symbols. Repeating the symbol sequence also increases the time diversity of the data to overcome fading. In the exemplary embodiment, the constant number of symbols is equal to 6,144 symbols for each frame making the symbol rate 307.2 kilosymbols per second (ksps). Also, variable starting point repeater 138 uses a different starting point to begin the repetition for each symbol sequence. When the value of $N_R$ necessary to generate 6,144 symbols per frame is not an integer, the final repetition is only performed for a portion of the symbol sequence. The resulting set of repeated symbols are received by BPSK mapper 139 which generates a BPSK code symbol stream (BPSK) of +1 and −1 values for performing BPSK modulation. In an alternative embodiment of the invention variable starting point repeater 138 is placed before block interleaver 136 so that block interleaver 136 receives the same number of symbols for each frame.

Within QPSK channel encoder 102 the QPSK data is received by CRC check sum generator 140 which generates a check sum for each 20-ms frame. The frame including the CRC check sum is received by code tail bits generator 142 which appends a set of eight tail bits of logic zeros at the end of the frame. The frame, now including the code tail bits and CRC check sum, is received by convolutional encoder 144 which performs K=9, R=¼ convolutional encoding, thereby generating symbols at a rate four times the encoder input rate ($E_R$). Block interleaver 146 performs bit interleaving on the symbols and the resulting interleaved symbols are received by variable starting point repeater 148. Variable starting point repeater 148 repeats the interleaved symbol sequence a sufficient number of times $N_R$ using a different starting point within the symbol sequence for each repetition to generate 12,288 symbols for each frame making the code symbol rate 614.4 kilosymbols per second (ksps). When $N_R$ is not an integer, the final repetition is performed for only a portion of the symbol sequence. The resulting repeated symbols are received by QPSK mapper 149 which generates a QPSK code symbol stream configured for performing QPSK modulation comprised of an in-phase QPSK code symbol stream of +1 and −1 values ($QPSK_I$), and a quadrature-phase QPSK code symbol stream of +1 and −1 values ($QPSK_Q$). In an alternative embodiment of the invention variable starting point repeater 148 is placed before block interleaver 146 so that block interleaver 146 receives the same number of symbols for each frame.

Figure 4:
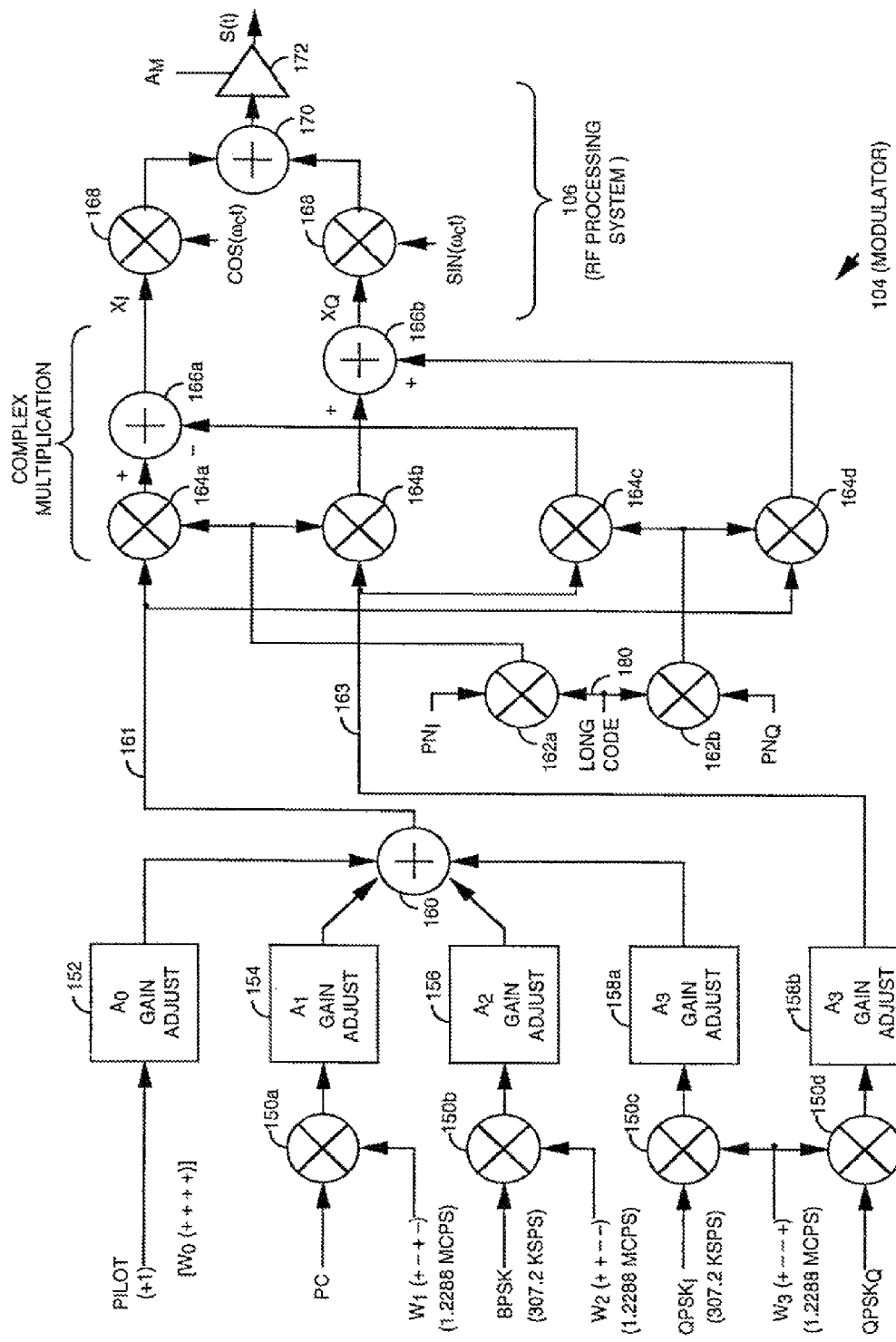
FIG. 4 is a block diagram of a transmit signal processing system configured in accordance with the exemplary embodiment of the invention.

FIG. 4 is a block diagram of modulator 104 of FIG. 2 configured in accordance with the exemplary embodiment of the invention. The BPSK symbols from BPSK channel encoder 103 are each modulated by Walsh code $W_2$ using a multiplier 150b, and the $QPSK_I$ and $QPSK_Q$ symbols from QPSK channel encoder 102 are each modulated with Walsh code $W_3$ using multipliers 150c and 150d. The power control data (PC) is modulated by Walsh code $W_1$ using multiplier 150a. Gain adjust 152 receives pilot data (PILOT), which in the preferred embodiment of the invention is comprised of the logic level associated with positive voltage, and adjusts the amplitude according to a gain adjust factor $A_0$. The PILOT signal provides no user data but rather provides phase and amplitude information to the base station so that it can coherently demodulate the data carried on the remaining sub-channels, and scale the soft-decision output values for combining. Gain adjust 154 adjusts the amplitude of the Walsh code $W_1$ modulated power control data according to gain adjust factor $A_1$, and gain adjust 156 adjusts the amplitude of the Walsh code $W_2$ modulated BPSK channel data according amplification variable $A_2$. Gain adjusts 158a and b adjust the amplitude of the in-phase and quadrature-phase Walsh code $W_3$ modulated QPSK symbols respectively according to gain adjust factor $A_3$. The four Walsh codes used in the preferred embodiment of the invention are shown in Table I.

TABLE I

| Walsh Code | Modulation Symbols |
|---|---|
| $W_0$ | ++++ |
| $W_1$ | +−+− |
| $W_2$ | ++−− |
| $W_3$ | +−−+ |

It will be apparent to one skilled in the art that the $W_0$ code is effectively no modulation at all, which is consistent with processing of the pilot data shown. The power control data is modulated with the $W_1$ code, the BPSK data with the $W_2$ code, and the QPSK data with the $W_3$ code. Once modulated with the appropriate Walsh code, the pilot, power control data, and BPSK data are transmitted in accordance with BPSK techniques and the QPSK data ($QPSK_I$ and $QPSK_Q$) in accordance with QPSK techniques as described below. It should also be understood that it is not necessary that every orthogonal channel be used, and that the use of only three of the four Walsh codes where only one user channel is provided is employed in an alternative embodiment of the invention.

The use of short orthogonal codes generates fewer chips per symbol, and therefore allows for more extensive coding and repetition when compared to systems incorporating the use of longer Walsh codes. This more extensive coding and repetition provides protection against Raleigh fading which is a major source of error in terrestrial communication systems. The use of other numbers of codes and code lengths is consistent with the present invention, however, the use of a larger set of longer Walsh codes reduces this enhanced protection against fading. The use of four-chip codes is considered optimal because four channels provide substantial flexibility for the transmission of various types of data as illustrated below while also maintaining short code length.

Summer 160 sums the resulting amplitude adjusted modulation symbols from gain adjusts 152, 154, 156 and 158a to generate summed modulation symbols 161. PN spreading codes $PN_I$ and $PN_Q$ are spread via multiplication with long code 180 using multipliers 162a and b. The resulting pseudorandom code provided by multipliers 162a and 162b are used to modulate the summed modulation symbols 161, and gain adjusted quadrature-phase symbols $QPSK_Q$ 163, via complex multiplication using multipliers 164a-d and summers 166a and b. The resulting in-phase term $X_I$ and quadrature-phase term $X_Q$ are then filtered (filtering not shown), and upconverted to the carrier frequency within RF processing system 106 shown in a highly simplified form using multipliers 168 and an in-phase and a quadrature-phase sinusoid. An offset QPSK upconversion could also be used in an alternative embodiment of the invention. The resulting in-phase and quadrature-phase upconverted signals are summed using summer 170 and amplified by master amplifier 172 according to master gain adjust $A_M$ to generate signal s(t) which is transmitted to base station 120. In the preferred embodiment of the invention, the signal is spread and filtered to a 1.2288 MHz bandwidth to remain compatible with the bandwidth of existing CDMA channels.

By providing multiple orthogonal channels over which data may be transmitted, as well as by using variable rate repeaters that reduce the amount of repeating $N_R$ performed in response to high input data rates, the above described method and system of transmit signal processing allows a single subscriber unit or other transmit system to transmit data at a variety of data rates. In particular, by decreasing the rate of repetition $N_R$ performed by variable starting point repeaters 138 or 148 of FIG. 3, an increasingly higher encoder input rate $E_R$ can be sustained. In an alternative embodiment of the invention rate ½ convolution encoding is performed with the rate of repetition $N_R$ increased by two. A set of exemplary encoder rates $E_R$ supported by various rates of repetition $N_R$ and encoding rates R equal to ¼ and ½ for the BPSK channel and the QPSK channel are shown in Tables II and III respectively.

TABLE II

BPSK Channel

| Label | $E_R$, BPSK (bps) | Encoder Out R = ¼ (bits/frame) | $N_R$, R = ¼ (Repetition Rate, R = ¼) | Encoder Out R = ½ (bits/frame) | $N_R$, R = ½ (Repetition Rate, R = ½) |
|---|---|---|---|---|---|
| High Rate-72 | 76,800 | 6,144 | 1 | 3,072 | 2 |
| High Rate-64 | 70,400 | 5,632 | 1¹/₁₁ | 2,816 | 2²/₁₁ |
|  | 51,200 | 4,096 | 1½ | 2,048 | 3 |
| High Rate-32 | 38,400 | 3,072 | 2 | 1,536 | 4 |
|  | 25,600 | 2,048 | 3 | 1,024 | 6 |

TABLE II-continued

BPSK Channel

| Label | $E_R$, BPSK (bps) | Encoder Out R = ¼ (bits/frame) | $N_R$, R = ¼ (Repetition Rate, R = ¼) | Encoder Out R = ½ (bits/frame) | $N_R$, R = ½ (Repetition Rate, R = ½) |
|---|---|---|---|---|---|
| RS2-Full Rate | 14,400 | 1,152 | 5⅓ | 576 | 10⅔ |
| RS1-Full Rate | 9,600 | 768 | 8 | 384 | 16 |
| NULL | 850 | 68 | 90⁶/₁₇ | 34 | 180¹²/₁₇ |

TABLE III

QPSK Channel

| Label | $E_R$, QPSK (bps) | Encoder Out R = ¼ (bits/frame) | $N_R$, R = ¼ (Repetition Rate, R = ¼) | Encoder Out R = ½ (bits/frame) | $N_R$, R = ½ (Repetition Rate, R = ½) |
|---|---|---|---|---|---|
|  | 153,600 | 12,288 | 1 | 6,144 | 2 |
| High Rate-72 | 76,800 | 6,144 | 2 | 3,072 | 4 |
| High Rate-64 | 70,400 | 5,632 | 2²/₁₁ | 2,816 | 4⁴/₁₁ |
|  | 51,200 | 4,096 | 3 | 2,048 | 6 |
| High Rate-32 | 38,400 | 3,072 | 4 | 1,536 | 8 |
|  | 25,600 | 2,048 | 6 | 1,024 | 12 |
| RS2-Full Rate | 14,400 | 1,152 | 10⅔ | 576 | 21⅓ |
| RS1-Full Rate | 9,600 | 768 | 16 | 384 | 32 |
| NULL | 850 | 68 | 180¹²/₁₇ | 34 | 361⁷/₁₇ |

Tables II and III show, that by adjusting the number of sequence repetitions $N_R$, a wide variety of data rates can be supported including high data rates, as the encoder input rate $E_R$ corresponds to the data transmission rate minus a constant necessary for the transmission of CRC, code tail bits and any other overhead information. As also shown by tables II and III, QPSK modulation may also be used to increase the data transmission rate. Rates expected to be used commonly are provided labels such as "High Rate-72" and "High Rate-32." Those rates noted as High Rate-72, High Rate-64, and High Rate-32 have traffic rates of 72, 64 and 32 kbps, respectively, plus, these rates are multiplexed in signaling and other control data with rates of 3.6, 5.2, and 5.2 kbps, respectively, in the exemplary embodiment of the invention. Rates RS1-Full Rate and RS2-Full Rate correspond to rates used in IS-95 compliant communication systems, and therefore, are also expected to receive substantial use for purposes of compatibility. The null rate is the transmission of a single bit and is used to indicate a frame erasure, which is also part of the IS-95 standard.

The data transmission rate may also be increased by simultaneously transmitting data over two or more of the multiple orthogonal channels performed either in addition to, or instead of, increasing the transmission rate via reduction of the repetition rate $N_R$. For example, a multiplexer (not shown) could split a single data source into a multiple data source to be transmitted over multiple data sub-channels. Thus, the total transmit rate can be increased via either transmission over a particular channel at higher rates, or multiple transmissions performed simultaneously over multiple channels, or both, until the signal processing capability of the receive system is exceeded and the error rate becomes unacceptable, or the maximum transmit power of the transmit system power is reached.

Providing multiple channels also enhances flexibility in the transmission of different types of data. For example, the BPSK channel may be designated for voice information and the QPSK channel designated for transmission of digital data. This embodiment could be more generalized by designating one channel for transmission of time-sensitive data such as voice at a lower data rate, and designating the other channel for transmission of less time sensitive data such as digital files. In this embodiment interleaving could be performed in larger blocks for the less time sensitive data to further increase time diversity. In another embodiment of the invention, the BPSK channel performs the primary transmission of data, and the QPSK channel performs overflow transmission. The use of orthogonal Walsh codes eliminates or substantially reduces any interference among the set of channels transmitted from a subscriber unit, and thus minimizes the transmit energy necessary for their successful reception at the base station.

To increase the processing capability at the receive system, and therefore increase the extent to which the higher transmission capability of the subscriber unit may be utilized, pilot data is also transmitted via one of the orthogonal channels. Using the pilot data, coherent processing can be performed at the receive system by determining and removing the phase offset of the reverse link signal. Also, the pilot data can be used to optimally weigh multipath signals received with different time delays before being combined in a rake receiver. Once the phase offset is removed, and the multipath signals properly weighted, the multipath signals can be combined decreasing the power at which the reverse link signal must be received for proper processing. This decrease in the required receive power allows greater transmissions rates to be processed successfully, or conversely, the interference between a set of reverse link signals to be decreased. While some additional transmit power is necessary for the transmission of the pilot signal, in the context of higher transmission rates, the ratio of pilot channel power to the total reverse link signal power is substantially lower than that associated with lower data rate digital voice data transmission cellular systems. Thus, within a high data rate CDMA system the $E_b/N_0$ gains achieved by the use of a coherent reverse link outweigh the additional power necessary to transmit pilot data from each subscriber unit.

The use of gain adjusts 152-158, as well as master amplifier 172, further increases the degree to which the high transmission capability of the above described system can be utilized by allowing the transmit system to adapt to various radio channel conditions, transmission rates, and data types. In particular, the transmit power of a channel that is necessary for proper reception may change over time, and with changing conditions, in a manner that is independent of the other orthogonal channels. For example, during the initial acquisition of the reverse link signal the power of the pilot channel may need to be increased to facilitate detection and synchronization at the base station. Once the reverse link signal is acquired, however, the necessary transmit power of the pilot channel would substantially decrease and would vary depending on various factors including the subscriber units rate of movement. Accordingly, the value of the gain adjust factor $A_0$ would be increased during signal acquisition, and then reduced during an ongoing communication. In another example, when information more tolerable of error is being transmitted via the forward link, or the environment in which the forward link transmission is taking place is not prone to fade conditions, the gain adjust factor $A_1$ may be reduced as the need to transmit power control data with a low error rate decreases. In one embodiment of the invention, whenever power control adjustment is not necessary, the gain adjust factor $A_1$ is reduced to zero.

In another embodiment of the invention, the ability to gain adjust each orthogonal channel or the entire reverse link signal is further exploited by allowing the base station 120 or other receive systems to alter the gain adjust of a channel, or of the entire reverse link signal, via the use of power control commands transmitted via the forward link signal. In particular, the base station may transmit power control information requesting the transmit power of a particular channel or the entire reverse link signal be adjusted. This is advantageous in many instances including when two types of data having different sensitivity to error, such as digitized voice and digital data, are being transmitted via the BPSK and QPSK channels. In this case, the base station 120 would establish different target error rates for the two associated channels. If the actual error rate of a channel exceeded the target error rate, the base station would instruct the subscriber unit to reduce the gain adjust of that channel until the actual error rate reached the target error rate. This would eventually lead to the gain adjust factor of one channel being increased relative to the other. That is, the gain adjust factor associated with the more error sensitive data would be increased relative to the gain adjust factor associated with the less sensitive data. In other instances, the transmit power of the entire reverse link may require adjustment due to fade conditions or movement of the subscriber unit 100. In these instances, the base station 120 can do so via transmission of a single power control command.

Thus, by allowing the gain of the four orthogonal channels to be adjusted independently, as well as in conjunction with one another, the total transmit power of the reverse link signal can be kept at the minimum necessary for successful transmission of each data type, whether it is pilot data, power control data, signaling data, or different types of user data. Furthermore, successful transmission can be defined differently for each data type. Transmitting with the minimum amount of power necessary allows the greatest amount of data to be transmitted to the base station given the finite transmit power capability of a subscriber unit, and also reduces the interference between subscriber units. This reduction in interference increases the total communication capacity of the entire CDMA wireless cellular system.

The power control channel used in the reverse link signal allows the subscriber unit to transmit power control information to the base station at a variety of rates including a rate of 800 power control bits per second. In the preferred embodiment of the invention, a power control bit instructs the base station to increase or decrease the transmit power of the forward link traffic channel being used to transmit information to the subscriber unit. While it is generally useful to have rapid power control within a CDMA system, it is especially useful in the context of higher data rate communications involving data transmission, because digital data is more sensitive to errors, and the high transmission causes substantial amounts of data to be lost during even brief fade conditions. Given that a high speed reverse link transmission is likely to be accompanied by a high speed forward link transmission, providing for the rapid transmission of power control over the reverse link further facilitates high speed communications within CDMA wireless telecommunications systems.

In an alternative exemplary embodiment of the invention a set of encoder input rates $E_R$ defined by the particular $N_R$ are used to transmit a particular type of data. That is, data may be transmitted at a maximum encoder input rate $E_R$ or at a set of lower encoder input rates $E_R$, with the associated $N_R$ adjusted accordingly. In the preferred implementation of this embodiment, the maximum rates corresponds to the maximum rates used in IS-95 compliant wireless communication system, referred to above with respect to Tables II and III as RS1-Full Rate and RS2-Full Rate, and each lower rate is approximately one half the next higher rate, creating a set of rates comprised of a full rate, a half rate, a quarter rate, and an eighth rate. The lower data rates are preferable generated by increasing the symbol repetition rate $N_R$ with value of $N_R$ for rate set one and rate set two in a BPSK channel provided in Table IV.

TABLE IV

RS1 and RS2 Rate Sets in BPSK Channel

| Label | ER, QPSK (bps) | Encoder Out R = ¼ (bits/frame) | NR, R = ¼ (Repetition Rate, R = ¼) | Encoder Out R = ½ (bits/frame) | NR, R = ½ (Repetition Rate, R = ½) |
|---|---|---|---|---|---|
| RS2-Full Rate | 14,400 | 1,152 | 5⅓ | 576 | 10⅔ |
| RS2-Half Rate | 7,200 | 576 | 10⅔ | 288 | 21⅓ |
| RS2-Quarter Rate | 3,600 | 288 | 21⅓ | 144 | 42⅔ |
| RS2-Eighth Rate | 1,900 | 152 | 40⁸⁄₁₉ | 76 | 80¹⁶⁄₁₉ |
| RS1-Full Rate | 9,600 | 768 | 8 | 384 | 16 |
| RS1-Half Rate | 4,800 | 384 | 16 | 192 | 32 |
| RS1-Quarter Rate | 2,800 | 224 | 27³⁄₇ | 112 | 54⁶⁄₇ |
| RS1-Eighth Rate | 1,600 | 128 | 48 | 64 | 96 |
| NULL | 850 | 68 | 90⁶⁄₁₇ | 34 | 180¹²⁄₁₇ |

The repetition rates for a QPSK channel is twice that for the BPSK channel.

In accordance with the exemplary embodiment of the invention, when the data rate of a frame changes with respect to the previous frame the transmit power of the frame is adjusted according to the change in transmission rate. That is, when a lower rate frame is transmitted after a higher rate frame, the transmit power of the transmit channel over which the frame is being transmitted is reduced for the lower rate frame in proportion to the reduction in rate, and vice versa. For example, if the transmit power of a channel during the transmission of a full rate frame is transmit power T, the transmit power during the subsequent transmission of a half rate frame is transmit power T/2. The reduction in transmit power is preferably performed by reducing the transmit power for the entire duration of the frame, but may also be performed by reducing the transmit duty cycle such that some redundant information is "blanked out." In either case, the transmit power adjustment takes place in combination with a closed loop power control mechanism whereby the transmit power is further adjusted in response to power control data transmitted from the base station.

Figure 5:
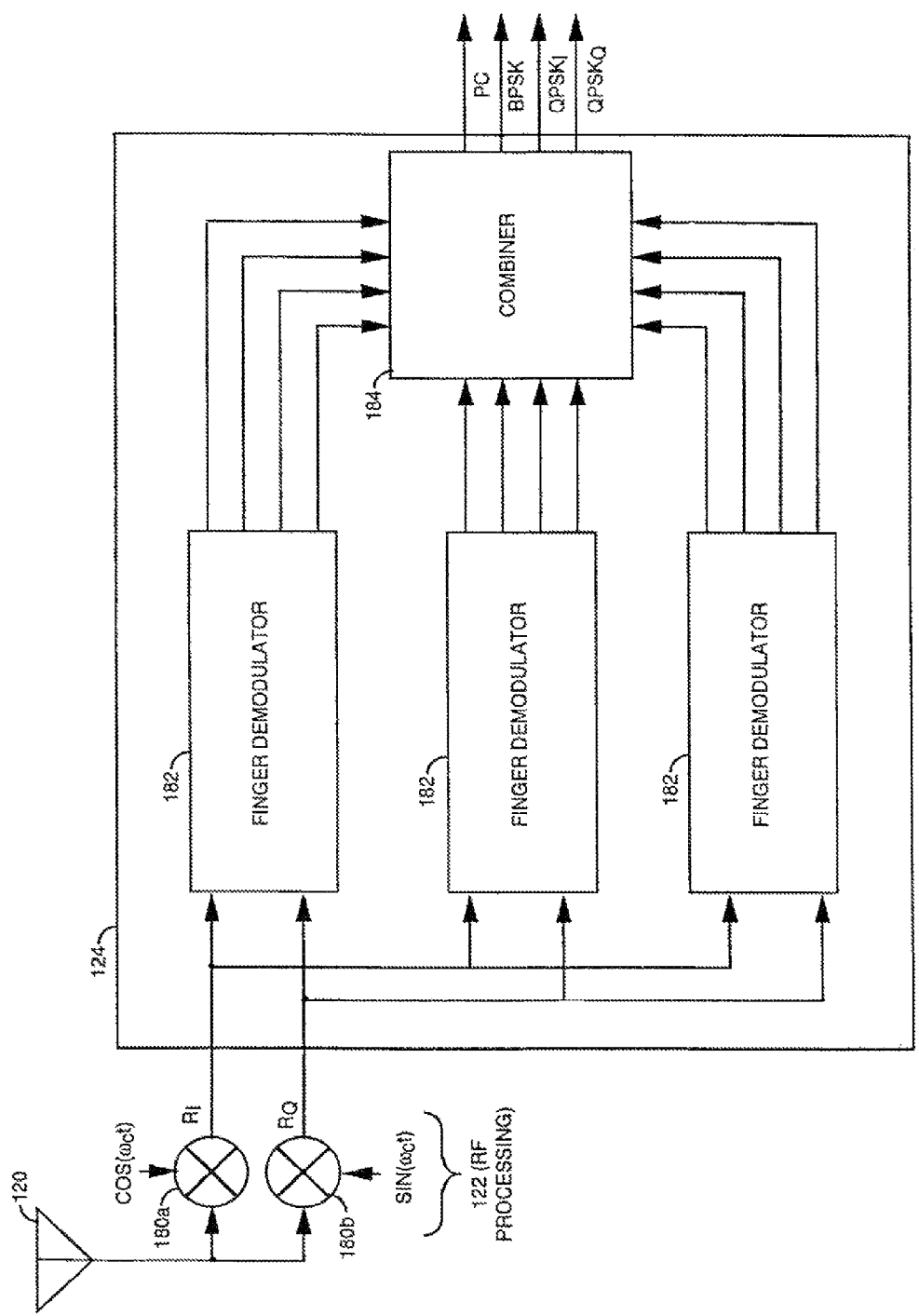
FIG. 5 is a block diagram of a receive processing system configured in accordance with the exemplary embodiment of the invention.

FIG. 5 is a block diagram of RF processing system 122 and demodulator 124 of FIG. 2 configured in accordance with the exemplary embodiment of the invention. Multipliers 180a and 180b downconvert the signals received from antenna 121 with an in-phase sinusoid and a quadrature phase sinusoid producing in-phase receive samples $R_I$ and quadrature-phase receive samples $R_Q$ receptively. It should be understood that RF processing system 122 is shown in a highly simplified form, and that the signals are also match-filtered and digitized (not shown) in accordance with widely known techniques. Receive samples $R_I$ and $R_Q$ are then applied to finger demodulators 182 within demodulator 124. Each finger demodulator 182 processes an instance of the reverse link signal transmitted by subscriber unit 100, if such an instance is available, where each instance of the reverse link signal is generated via multipath phenomenon. While three finger demodulators are shown, the use of alternative numbers of finger processors are consistent with the invention including the use of a single finger demodulator 182. Each finger demodulator 182 produces a set of soft decision data comprised of power control data, BPSK data, and $QPSK_I$ data and $QPSK_Q$ data. Each set of soft decision data is also time adjusted within the corresponding finger demodulator 182, although time-adjustment could be performed within combiner 184 in an alternative embodiment of the invention. Combiner 184 then sums the sets of soft decision data received from finger demodulators 182 to yield a single instance of power control, BPSK, $QPSK_I$ and $QPSK_Q$ soft decision data.

Figure 6:
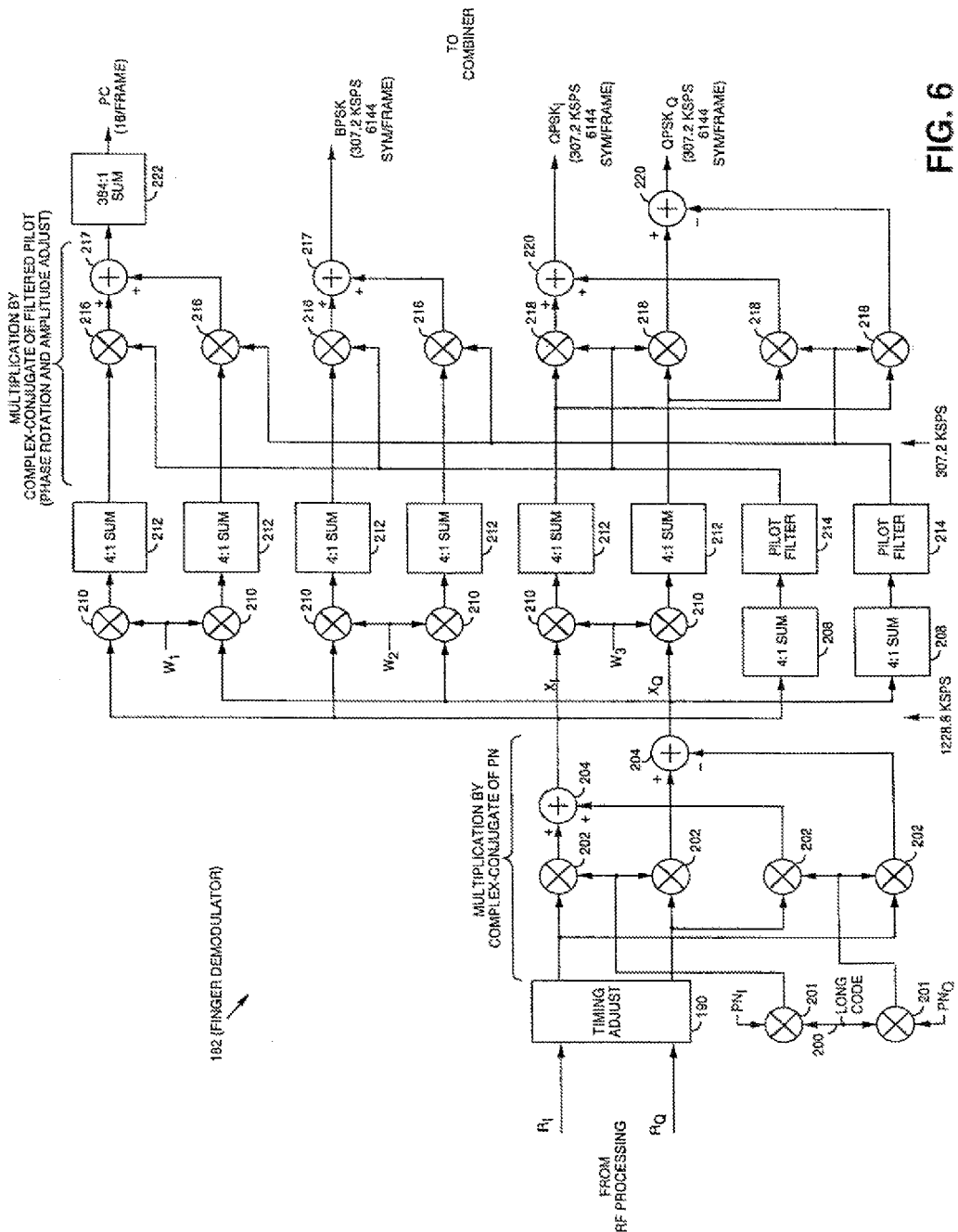
FIG. 6 is a block diagram of a finger processing system configured in accordance with one embodiment of the invention.

FIG. 6 is a block diagram of a finger demodulator 182 of FIG. 5 configured in accordance with the exemplary embodiment of the invention. The $R_I$ and $R_Q$ receive samples are first time adjusted using time adjust 190 in accordance with the amount of delay introduced by the transmission path of the particular instance of the reverse link signal being processed. Long code 200 is mixed with pseudorandom spreading codes $PN_I$ and $PN_Q$ using multipliers 201, and the complex conjugate of the resulting long code modulated $PN_I$ and $PN_Q$ spreading codes are complex-multiplied with the time adjusted $R_I$ and $R_Q$ receive samples using multipliers 202 and summers 204 yielding terms $X_I$ and $X_Q$. Three separate instances of the $X_I$ and $X_Q$ terms are then demodulated using the Walsh codes $W_1$, $W_2$ and $W_3$ respectively, and the resulting Walsh demodulated data is summed over four demodulation chips using 4 to 1 summers 212. A fourth instance of the $X_I$ and $X_Q$ data is summed over four demodulation chips using summers 208, and then filtered using pilot filters 214. In the preferred embodiment of the invention pilot filter 214 performs averaging over a series of summations performed by summers 208, but other filtering techniques will be apparent to one skilled in the art. The filtered in-phase and quadrature-phase pilot signals are used to phase rotate and scale the $W_1$, and $W_2$ Walsh code demodulated data in accordance with BPSK modulated data via complex conjugate multiplication using multipliers 216 and adders 217 yielding soft decision power control and BPSK data. The $W_3$ Walsh code-modulated data is phase rotated using the in-phase and quadrature-phase filtered pilot signals in accordance with QPSK modulated data using multipliers 218 and adders 220, yielding soft decision QPSK data. The soft decision power control data is summed over 384 modulation symbols by 384 to 1 summer 222 yielding power control soft decision data. The phase rotated $W_2$ Walsh code modulated data, the $W_3$ Walsh code modulated data, and the power control soft decision data are then made available for combining. In an alternative embodiment of the invention, encoding and decoding is performed on the power control data as well.

In addition to providing phase information the pilot may also be used within the receive system to facilitate time tracking. Time tracking is performed by also processing the received data at one sample time before (early), and one sample time after (late), the present receive sample being processed. To determine the time that most closely matches the actual arrival time, the amplitude of the pilot channel at the early and late sample time can be compared with the amplitude at the present sample time to determine that which is greatest. If the signal at one of the adjacent sample times is greater than that at the present sample time, the timing can be adjusted so that the best demodulation results are obtained.

Figure 7:
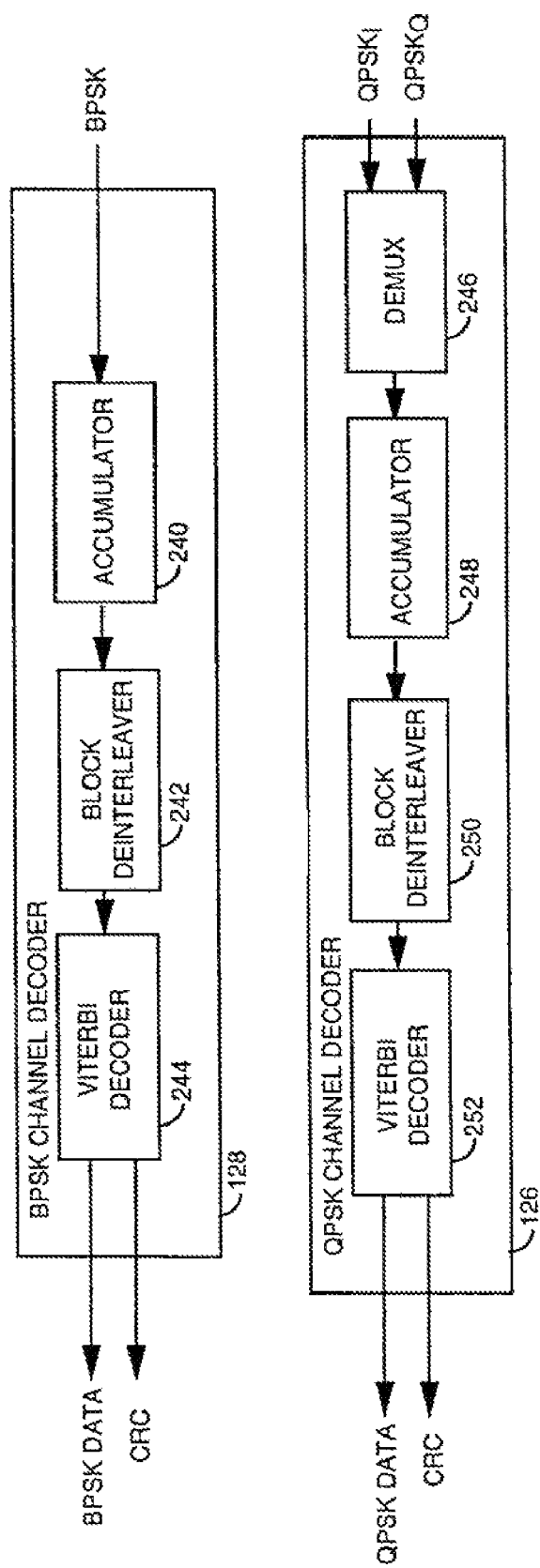
FIG. 7 is a block diagram of a BPSK channel decoder and a QPSK channel decoder configured in accordance with the exemplary embodiment of the invention.

FIG. 7 is a block diagram of BPSK channel decoder 128 and QPSK channel decoder 126 (FIG. 2) configured in accordance with the exemplary embodiment of the invention. BPSK soft decision data from combiner 184 (FIG. 5) is received by accumulator 240 which stores the first sequence of $6{,}144/N_R$ demodulation symbols in the received frame where $N_R$ depends on the transmission rate of the BPSK soft decision data as described above, and adds each subsequent set of $6{,}144/N_R$ demodulated symbols contained in the frame with the corresponding stored accumulated symbols. Block deinterleaver 242 deinterleaves the accumulated soft decision data from variable starting point accumulator 240, and Viterbi decoder 244 decodes the deinterleaved soft decision data to produce hard decision data as well as CRC check sum results. Within QPSK decoder 126 $QPSK_I$ and $QPSK_Q$ soft decision data from combiner 184 (FIG. 5) are demultiplexed into a single soft decision data stream by demux 246 and the single soft decision data stream is received by accumulator 248 which accumulates every $6{,}144/N_R$ demodulation symbols where $N_R$ depends on the transmission rate of the QPSK data. Block deinterleaver 250 deinterleaves the soft decision data from variable starting point accumulator 248 and Viterbi decoder 252 decodes the deinterleaved modulation symbols to produce hard decision data as well as CRC check sum results. In the alternative exemplary embodiment described above with respect to FIG. 3 in which symbol repetition is performed before interleaving, accumulators 240 and 248 are placed after block deinterleavers 242 and 250. In the embodiment of the invention incorporating the use of rate sets, and therefore in which the rate of particular frame is not known, multiple decoders are employed, each operating at a different transmission rate, and then the frame associated with the transmission rate most likely to have been used is selected based on the CRC checksum results. The use of other error checking methods is consistent with the practice of the present invention.

Figure 8:
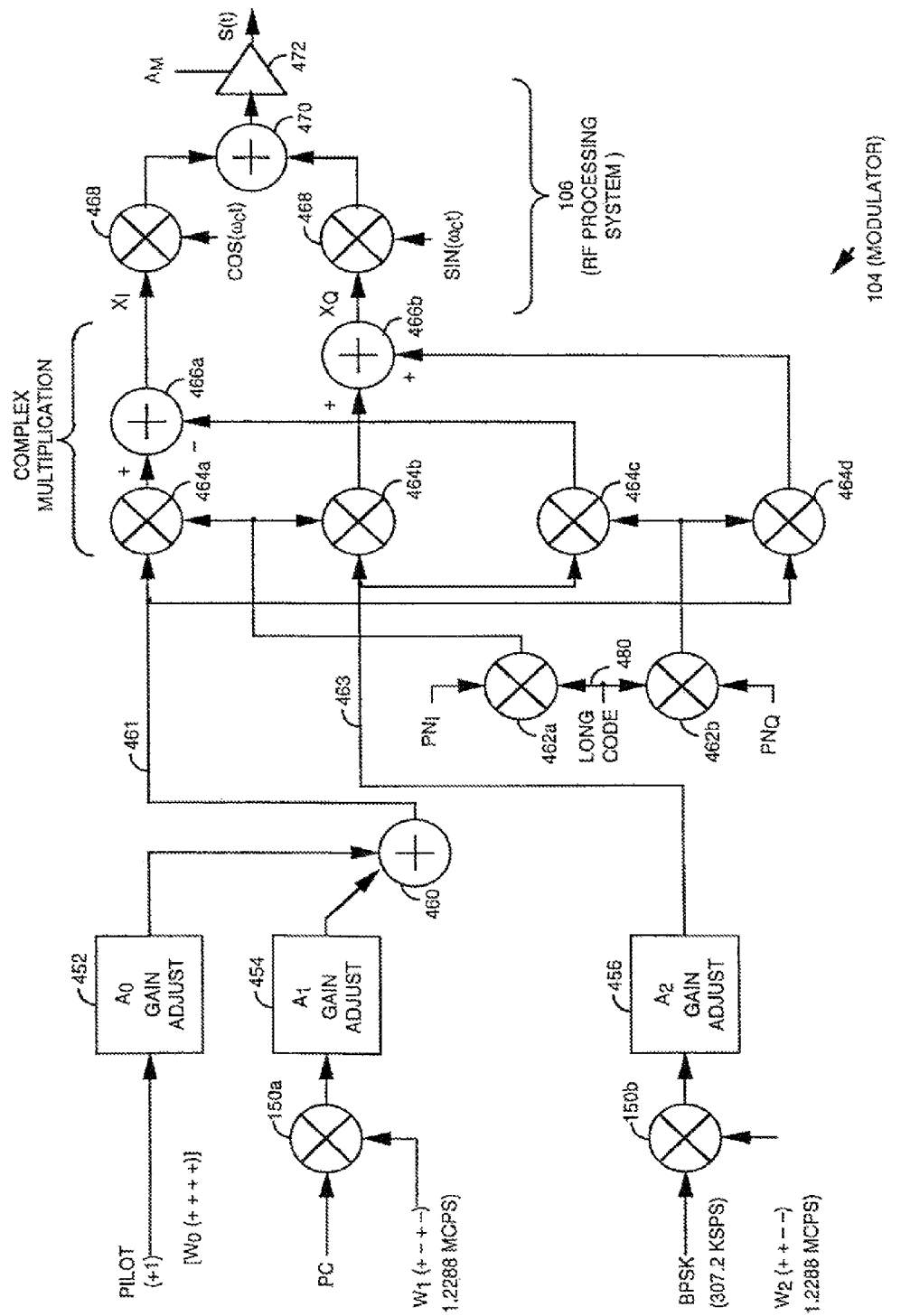
FIG. 8 is a block diagram of a transmit signal processing system configured in accordance with a second exemplary embodiment of the invention.

FIG. 8 is a block diagram of modulator 104 (FIG. 2) configured in an alternative embodiment of the invention in which a single BPSK data channel is employed. Pilot data is gain adjusted by gain adjust 452 in accordance with gain adjust factor $A_0$. Power control data is modulated with Walsh code $W_1$ by multiplier 150a and gain adjusted by gain adjust 454 in accordance with gain adjust factor $A_1$. The gain adjusted pilot data and power control data are summed by summer 460 producing summed data 461. BPSK data is modulated with Walsh code $W_2$ by multiplier 150b and then gain adjusted using gain adjust 456 in accordance with gain adjust factor $A_2$.

In-phase pseudo random spreading code ($PN_I$) and quadrature-phase pseudo random spreading code ($PN_Q$) are both modulated with long code 480. The resulting long code modulated $PN_I$ and $PN_Q$ codes are complex multiplied with the summed data 461 and the gain adjusted BPSK data from gain adjust 456 using multipliers 464a-d and summers 466a-b yielding terms $X_I$ and $X_Q$. Terms $X_I$ and $X_Q$ are then upconverted with in-phase and quadrature-phase sinusoids suing multipliers 468 and the resulting upconverted signals are summed by summers 476 respectively, and amplified by amplifier 472 in accordance with amplitude factor $A_M$ generating signal s(t).

The embodiment shown in FIG. 8 differs from the other embodiments described herein in that the BPSK data is placed in the quadrature-phase channel while the pilot data and power control data are placed in the in-phase channel. In the previous embodiments of the invention described herein the BPSK data is placed the in-phase channel along with the pilot data and power control data. Placing the BPSK data in the quadrature-phase channel and the pilot and power control data in the in-phase channel reduces the peak-to-average power ratio of the reverse link signal the phases of the channels are orthogonal causing the magnitude of the sum of the two channels to vary less in response to changing data. This reduces the peak power required to maintain a given average power, and thus reduces the peak-to-average power ratio characteristic of the reverse link signal. This reduction in the peak-to-average power ratio decreases the peak power at which a reverse link signal must be received at the base station in order to sustain a given transmission rate, and therefore increases the distance in which a subscriber unit having a maximum transmit power may be located from the base station before it is unable to transmit a signal that can received at base station with the necessary peak power. This increases the range at which the subscriber unit can successfully conduct communication at any given data rate, or alternatively allows greater data rates to be sustained at a given distance.

Figure 9:
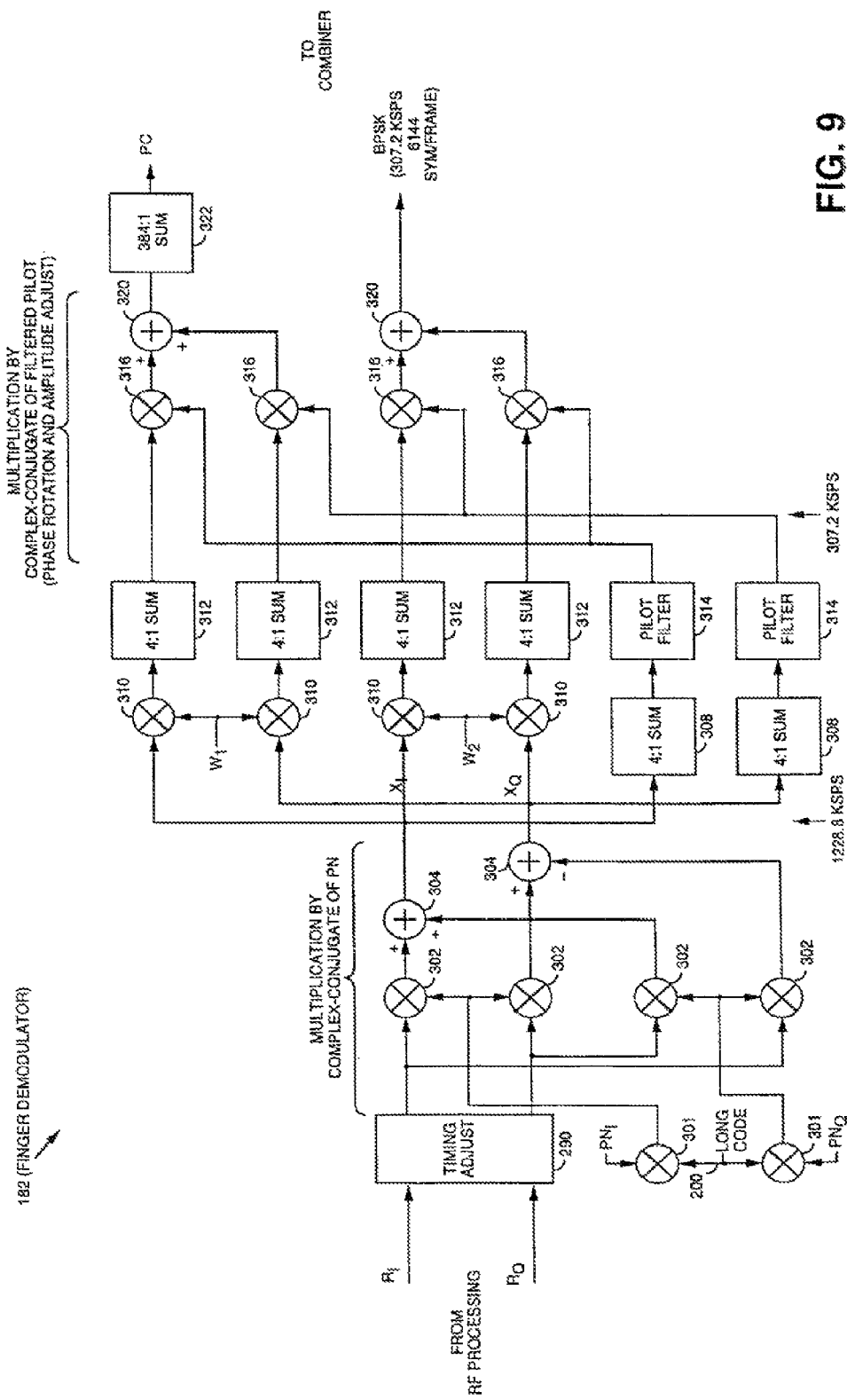
FIG. 9 is a block diagram of a finger processing system configured in accordance with one embodiment of the invention.

FIG. 9 is a block diagram of finger demodulator 182 when configured in accordance with the embodiment of the invention shown in FIG. 8. Receive samples $R_I$ and $R_Q$ are time adjusted by timing adjust 290 and the $PN_I$ and $PN_Q$ codes are multiplied by long code 200 using multipliers 301. The time adjusted receive samples are then multiplied by the complex conjugate of the $PN_I$ and $PN_Q$ codes using multipliers 302 and summers 304 yielding terms $X_I$ and $X_Q$. A first and second instance of the $X_I$ and $X_Q$ terms are demodulated using Walsh code $W_1$ and Walsh code $W_2$ using multipliers 310 and the resulting demodulation symbols are summed in sets of four using summers 312. A third instance of the $X_I$ and $X_Q$ terms are summed over four demodulation symbols by summers 308 to generate pilot reference data. The pilot reference data is filtered by pilot filters 314 and used to phase rotate and scale the summed Walsh code modulated data using multipliers 316 and adders 320 producing BPSK soft decision data, and after being summed over 384 symbols by 384:1 summer 322, soft decision power control data.

Figure 10:
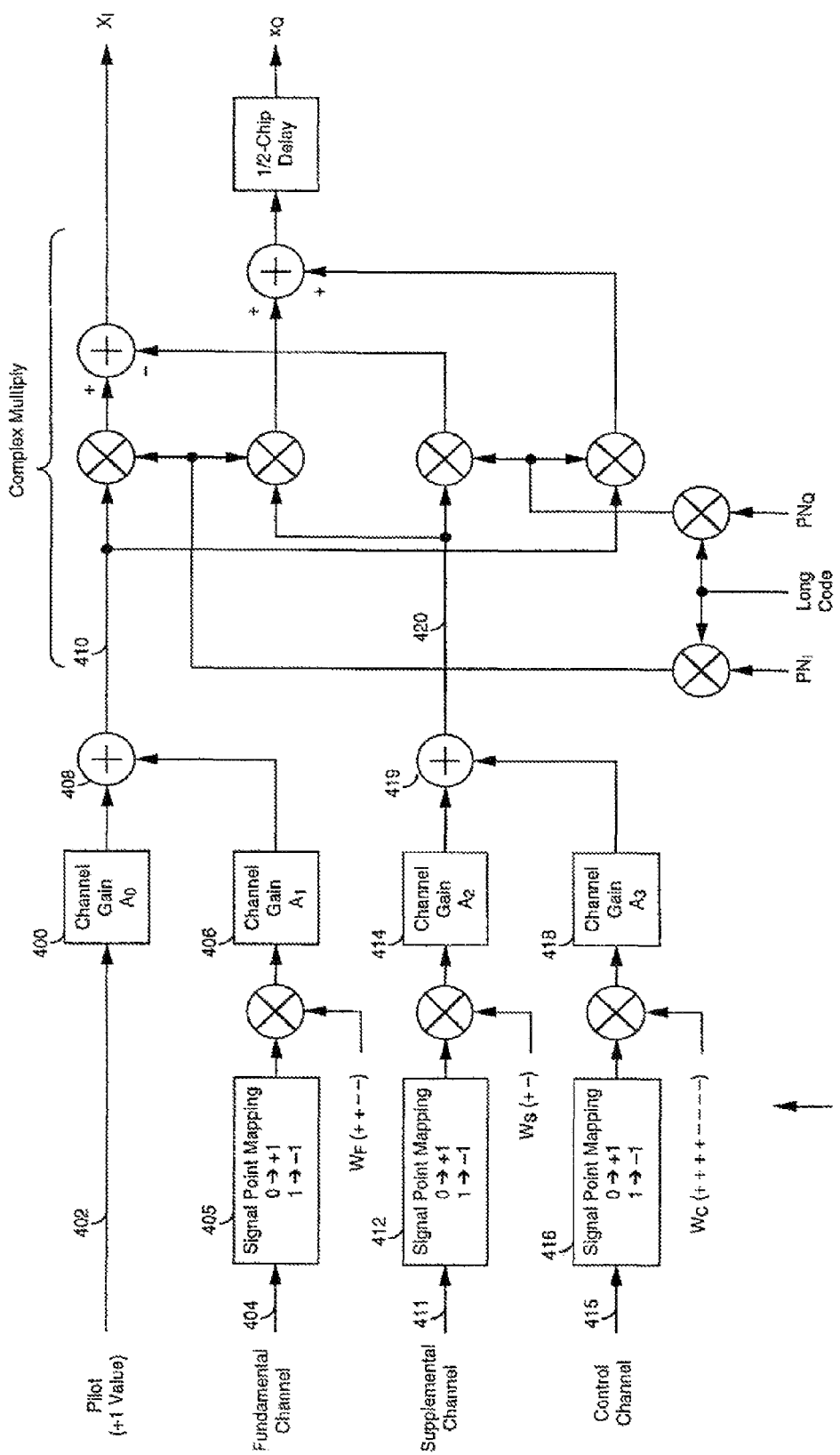
FIG. 10 is a block diagram of a transmit signal processing system configured in accordance with another embodiment of the invention.

FIG. 10 is a block diagram of a transmit system configured in accordance with still another embodiment of the invention. Channel gain 400 gain adjusts pilot channel 402 based on gain variable $A_0$. Fundamental channel symbols 404 are mapped into +1 and −1 values by mapper 405, and each symbol is modulated with Walsh code $W_F$ equal to +, +, −, − (where +=+1 and −=−1). The $W_F$ modulated data is gain-adjusted based on gain variable $A_1$ by gain adjust 406. The outputs of gain adjusts 400 and 406 are summed by summer 408 yielding in-phase data 410.

Supplemental channel symbols 411 are mapped to + and − values by signal point mapper 412, and each symbol is modulated with a Walsh code $W_S$ equal to +, −. Channel gain adjust 414 adjusts the gain of the $W_S$ modulated data. Control channel data 415 is mapped to + and − values by mapper 416. Each symbol is modulated with a Walsh code $W_C$ equal to +, +, +, +, −, −, −, −. The $W_C$ modulated symbols are gain-adjusted by channel gain adjust 418 based on gain variable $A_3$, and the output of channel gain adjusts 414 and 418 are summed by summer 419 to produce quadrature phase data 420.

It should be apparent that, since the Walsh codes $W_F$ and $W_S$ are different lengths, and are generated at the same chip rate, the fundamental channel transmits data symbols at a rate that is half that of the supplemental channel. For similar reasons, it should be apparent that the control channel transmits data symbols at half the rate of the fundamental channel.

In-phase data 410 and quadrature phase data 420 are complex multiplied by the $PN_I$ and $PN_Q$ spreading codes as shown, yielding in-phase term $X_I$ and quadrature phase term $X_Q$. The quadrature phase term $X_Q$ is delay by ½ the duration of a PN spreading code chip to perform offset QPSK spreading, and then term $X_I$ and term $X_Q$ are upconverted in accordance with the RF processing system 106 shown in FIG. 4, and described above.

By using Walsh codes $W_F$, $W_S$ and $W_C$ having different lengths as described above, this alternative embodiment of the invention provides a set of communication channels having a greater variety of rates. Additionally, the use of a shorter, two-chip, Walsh code $W_S$ for the supplemental channel provides an orthogonal higher data rate supplemental channel with a peak-to-average transmit power ratio that is less than that associated with the use of two channels based on 4-chip Walsh codes. This further enhances the performance of the transmit system in that a given amplifier will be able to sustain a higher rate, or transmit with greater range, using the lower peak-to-average transmit power waveform.

The Walsh code allocation scheme described with regard to FIG. 10, can also be viewed as the allocation of eight-chip Walsh space in accordance with Table VI.

TABLE VI

| Eight-Chip Walsh Code | Channel |
|---|---|
| ++++ ++++ | Pilot |
| +−+− +−+− | Supplemental |
| ++−− ++−− | Fundamental |
| +−−+ +−−+ | Supplemental |
| ++++ −−−− | Control |
| +−+− −+−+ | Supplemental |
| ++−− −−++ | Fundamental |
| +−−+ −++− | Supplemental |

In addition to reducing the peak to average transmit power ratio, allocating sets of eight-chip Walsh channels using a single shorter Walsh code decreases the complexity of the transmit system. For example, modulating with four eight-chip Walsh codes and summing the results require additional circuitry and therefore would be more complex.

It is further contemplated that the transmission system shown in FIG. 10 can operate at various spreading bandwidths, and therefore with the Walsh codes and spreading codes generated at various rates other than 1.2288 Mchips/second. In particular, a spreading bandwidth of 3.6864 MHz is contemplated, with a corresponding Walsh and spreading code rate of 3.6864 Mchips/second. FIGS. 11-14 illustrate the coding performed for the fundamental, supplemental and control channels in accordance with the use of a 3.6864-MHz spreading bandwidth. Typically, to adjust the coding for use with a 1.2288-MHz spreading bandwidth the number of symbol repeats is reduced. This principal or adjusting the number of symbol repeats can be applied more generally to increases in the spreading bandwidth including, for example, the use of a 5-MHz spreading bandwidth. Adjustments performed to the coding for a 1.2288-MHz spreading bandwidth system other than reduction in the number of symbol repeats are particularly noted in the description of FIGS. 11-14 provided below.

Figure 11:
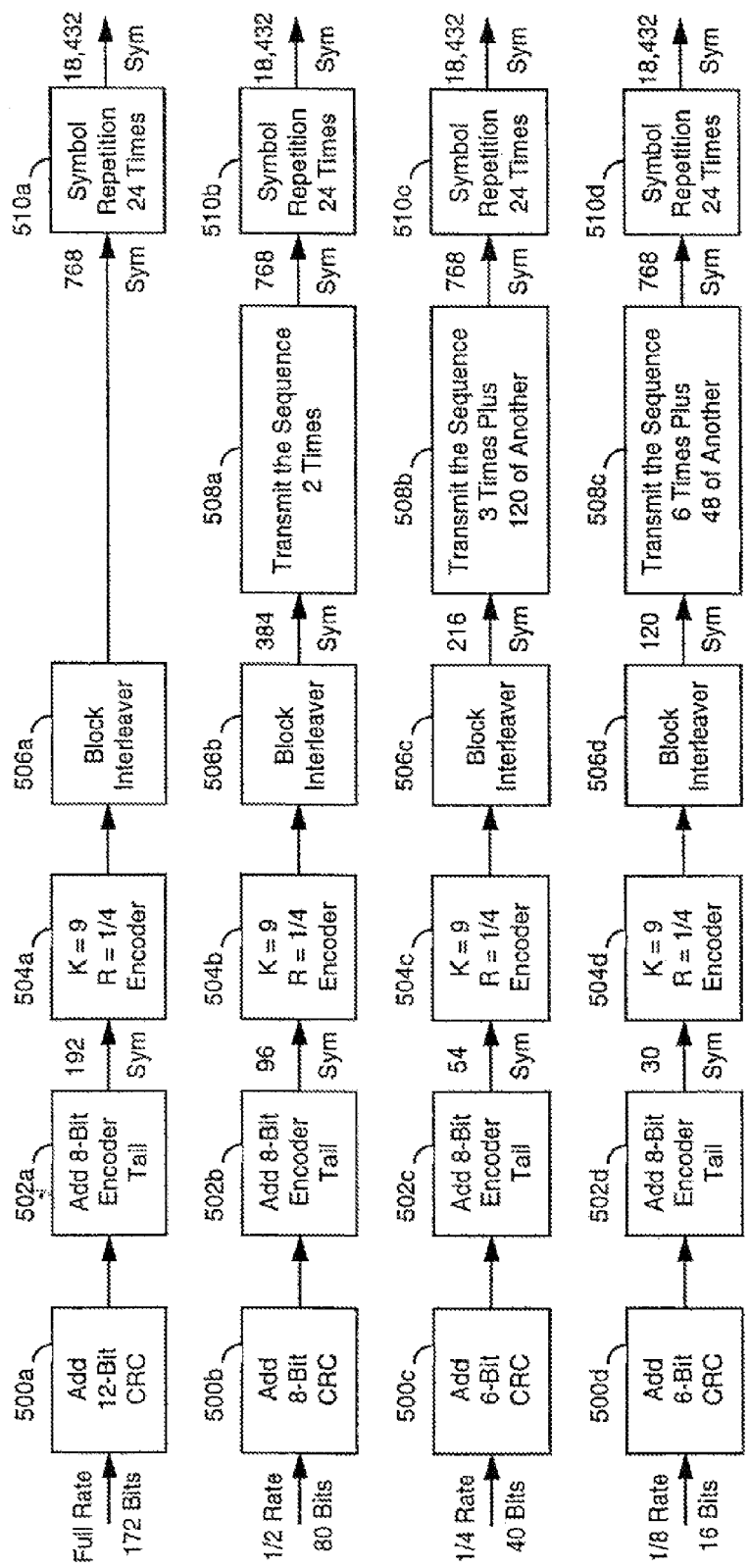
FIG. 11 is a block diagram of the coding performed for the fundamental channel when configured in accordance with one embodiment of the invention.

FIG. 11 shows the coding performed for the four rates (i.e. full, half, quarter and eight rate) that make up the IS-95 rate set 1 when performed in accordance with one embodiment of the invention. Data is supplied in 20-ms frames having the number of bits shown for each rate, and CRC check bits and eight tail bits are added by CRC checks sum generators 500*a-d* and tail bit generators 502*a-d*. Additionally, rate ¼ convolutional encoding is performed for each rate by convolutional encoders 504*a-d*, generating four code symbols for each data bit, CRC bit, or tail bit. The resulting frame of code symbols is block interleaved using block interleavers 506*a-d*, generating the number of symbols indicated. For the lower three rates, the symbols are transmitted repeatedly by transmission repeaters 508*a-c*, as indicated, causing 768 code symbols to be generated for each frame. The 768 code symbols for each rate are then repeated 24 times by symbol repeaters 510*a-d* generating 18,432 code symbols per frame for each rate.

As discussed above, each code symbol in the fundamental channel is modulated with a four bit Walsh code $W_F$ generated at 3,686,400 chips per second (3.6864 Mchips/second). Thus, for a 20-ms time interval (⅕₀th of a second) the number of Walsh and spreading code chips is 73,728, which corresponds to 4 Walsh chips for each of the 18.432 code symbol in the frame.

For a system operating at 1.2288 Mchips/second, the number of symbol repeats performed by symbol repeaters 510*a-d* is reduced to eight (8). Additionally, transmission repeater 508*b* repeats the sequence of symbols in the frame three (3) times, plus 120 of the symbols are transmitted a fourth time, and transmission repeater 508*c* repeats the sequence of symbols in the frame six (6) times, plus 48 of the symbols are repeated a seventh time. Additionally, a fourth transmission repeater (or fourth transmission repeat step) is included for the full rate (not shown) which transmits 384 of the sequence of symbols contained in the frame a second time. These repeated transmissions all provide 768 symbols of data which, when repeated eight times by symbol repeaters 510*a-d*, correspond to 6,144 symbols, which is the number of chips in a 20 ms frame at 1.2288 Mchips/second.

Figure 12:
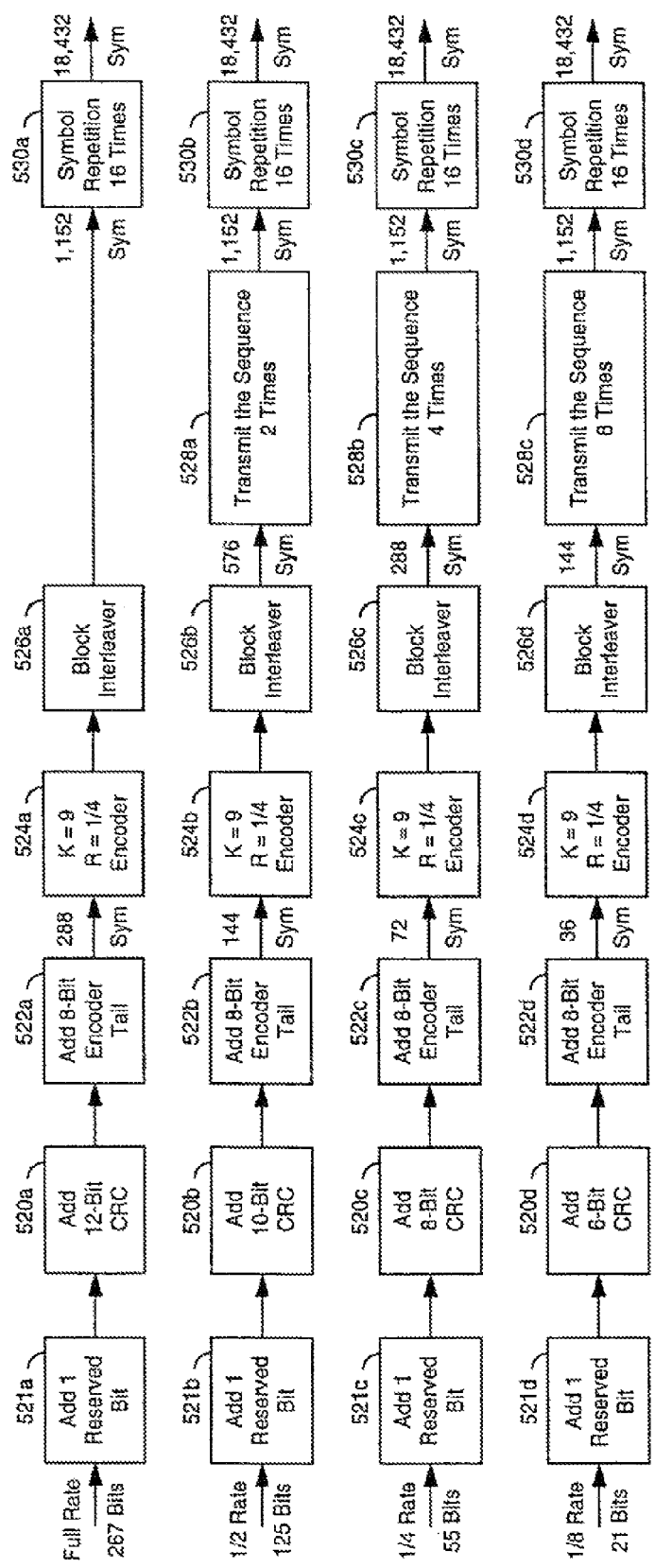
FIG. 12 is a block diagram of the coding performed for the fundamental channel when configured in accordance with one embodiment of the invention.

FIG. 12 shows the coding performed for the four rates that make up IS-95 rate set 2 when performed in accordance with one embodiment of the invention. Data is supplied in 20 ms frames having the number of bits shown for each rate, and a reserve bit is added by reserve bit augmenters 521*a-d* for each rate. CRC check bits and eight tail bits are also added by CRC checks sum generators 520*a-d* and tail bit generators 522*a-d*. Additionally, rate ¼ convolutional encoding is performed for each rate by convolutional encoders 524*a-d*, generating four code symbols for each data, CRC or tail bit. The resulting frame of code symbols is block interleaved using block interleaves 526*a-d* generating the number of symbols indicated. For the lower three rates, the symbols are transmitted repeatedly by transmission repeaters 528*a-c* as indicated, causing 768 code symbols to be generated for each frame. The 768 code symbols for each rate are then repeated 24 times by symbol repeaters 530*a-d* generating 18,432 code symbols per frame for each rate.

For a system operating at 1.2288 MHz spreading bandwidth, the number of symbol repeats performed by symbol repeaters 530*a-d* is reduced to four (4). Additionally, transmission repeater 528*a* transmits the sequence of symbols in the frame two (2) times, plus 384 of the symbols are transmitted a third time. Transmission repeater 528*b* repeats the sequence of symbols in the frame five (5) times, plus 96 of the symbols are transmitted a sixth time. Transmission repeater 528*c* repeats the sequence of symbols in the frame ten (10) times, plus 96 of the symbols are repeated an eleventh time. Additionally, a fourth transmission repeater (or fourth transmission repeat step) is included for the full rate (not shown) which transmits 384 of the sequence of symbols contained in the frame a second time. These repeated transmissions all provide 1,536 symbols of data which, when repeated four times by symbol repeaters 530*a-d*, correspond to 6,144 symbols.

Figure 13:
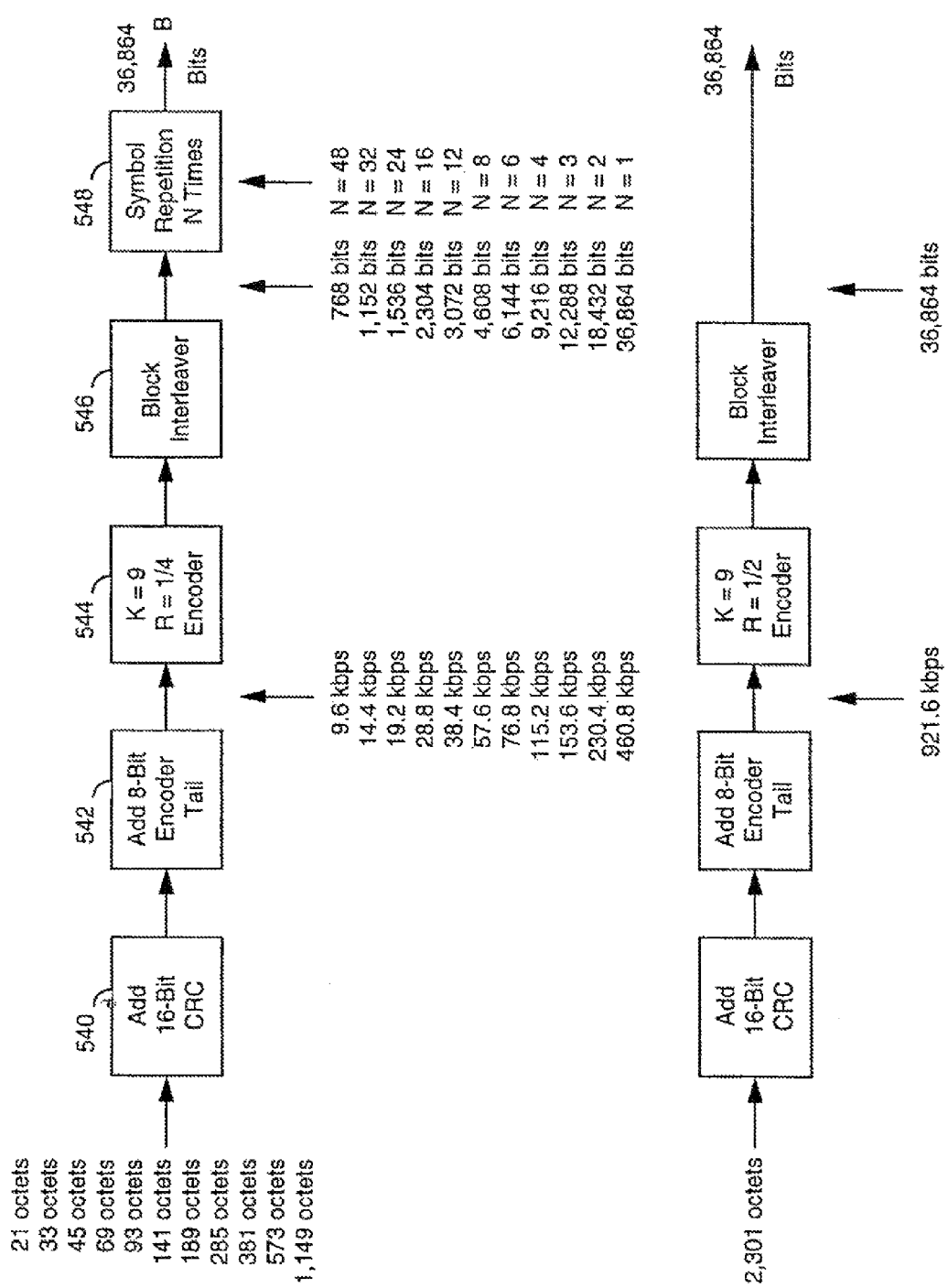
FIG. 13 is a block diagram of the coding performed for the supplemental channel when configured in accordance with one embodiment of the invention.

FIG. 13 illustrates the coding performed for the supplemental channel when performed in accordance with one embodiment of the invention. Frames of data are supplied at any of the eleven rates indicated, and CRC check sum generator 540 adds 16 bits of CRC checksum data. Tail bit generator 542 adds eight bits of encoder tail data resulting in frames having the data rates shown. Convolution encoder 544 performs rate ¼, constraint length K=9, encoding generating four code symbols for each data, CRC or tail bit received, and block interleaver 546 performs block interleaving on each frame, and outputs the number of code symbols shown for each frame in accordance with the input frame size. Symbol repeater 548 repeats the frames N times depending on the input frame size as indicated.

The encoding for an additional twelfth rate is shown, which is performed in a similar fashion to the eleven rates, with the exception that rate ½ encoding is performed instead of rate ¼. Additionally, no symbol repetition is performed.

A list of frame sizes, encoder input rates, code rates and symbol repetition factors N for various chip rates that can be applied to FIG. 13 to adjust for different chip rates (which correspond to spreading bandwidths) is provided in Table VII.

TABLE VII

| Chip Rate (Mcps) | Number of Octets per Frame | Encoder Input Rate (kbps) | Code Rate | Symbol Repetition Factor (N) |
|---|---|---|---|---|
| 1.2288 | 21 | 9.6 | ¼ | 16 |
| 1.2288 | 45 | 19.2 | ¼ | 8 |
| 1.2288 | 93 | 38.4 | ¼ | 4 |
| 1.2288 | 189 | 76.8 | ¼ | 2 |
| 1.2288 | 381 | 153.6 | ¼ | 1 |
| 1.2288 | 765 | 307.2 | ½ | 1 |
| 3.6864 | 21 | 9.6 | ¼ | 48 |
| 3.6864 | 33 | 14.4 | ¼ | 32 |
| 3.6864 | 45 | 19.2 | ¼ | 24 |
| 3.6864 | 69 | 28.8 | ¼ | 16 |
| 3.6864 | 93 | 38.4 | ¼ | 12 |
| 3.6864 | 141 | 57.6 | ¼ | 8 |
| 3.6864 | 189 | 76.8 | ¼ | 6 |
| 3.6864 | 285 | 115.2 | ¼ | 4 |
| 3.6864 | 381 | 153.6 | ¼ | 3 |
| 3.6864 | 573 | 230.4 | ¼ | 2 |
| 3.6864 | 1,149 | 460.8 | ¼ | 1 |
| 3.6864 | 2,301 | 921.6 | ½ | 1 |
| 7.3728 | 21 | 9.6 | ¼ | 96 |
| 7.3728 | 33 | 14.4 | ¼ | 64 |
| 7.3728 | 45 | 19.2 | ¼ | 48 |
| 7.3728 | 69 | 28.8 | ¼ | 32 |
| 7.3728 | 93 | 38.4 | ¼ | 24 |
| 7.3728 | 141 | 57.6 | ¼ | 16 |
| 7.3728 | 189 | 76.8 | ¼ | 12 |
| 7.3728 | 285 | 115.2 | ¼ | 8 |
| 7.3728 | 381 | 153.6 | ¼ | 6 |
| 7.3728 | 573 | 230.4 | ¼ | 4 |
| 7.3728 | 765 | 307.2 | ¼ | 3 |
| 7.3728 | 1,149 | 460.8 | ¼ | 2 |
| 7.3728 | 2,301 | 921.6 | ¼ | 1 |
| 7.3728 | 4,605 | 1,843.2 | ½ | 1 |
| 14.7456 | 21 | 9.6 | ¼ | 192 |
| 14.7456 | 33 | 14.4 | ¼ | 128 |
| 14.7456 | 45 | 19.2 | ¼ | 96 |
| 14.7456 | 69 | 28.8 | ¼ | 64 |
| 14.7456 | 93 | 38.4 | ¼ | 48 |
| 14.7456 | 141 | 57.6 | ¼ | 32 |
| 14.7456 | 189 | 76.8 | ¼ | 24 |
| 14.7456 | 285 | 115.2 | ¼ | 16 |
| 14.7456 | 381 | 153.6 | ¼ | 12 |
| 14.7456 | 573 | 230.4 | ¼ | 8 |
| 14.7456 | 765 | 307.2 | ¼ | 6 |
| 14.7456 | 1,149 | 460.8 | ¼ | 4 |
| 14.7456 | 1,533 | 614.4 | ¼ | 3 |
| 14.7456 | 2,301 | 921.6 | ¼ | 2 |
| 14.7456 | 4,605 | 1,843.2 | ¼ | 1 |
| 14.7456 | 9,213 | 3,686.4 | ½ | 1 |

Figure 14:
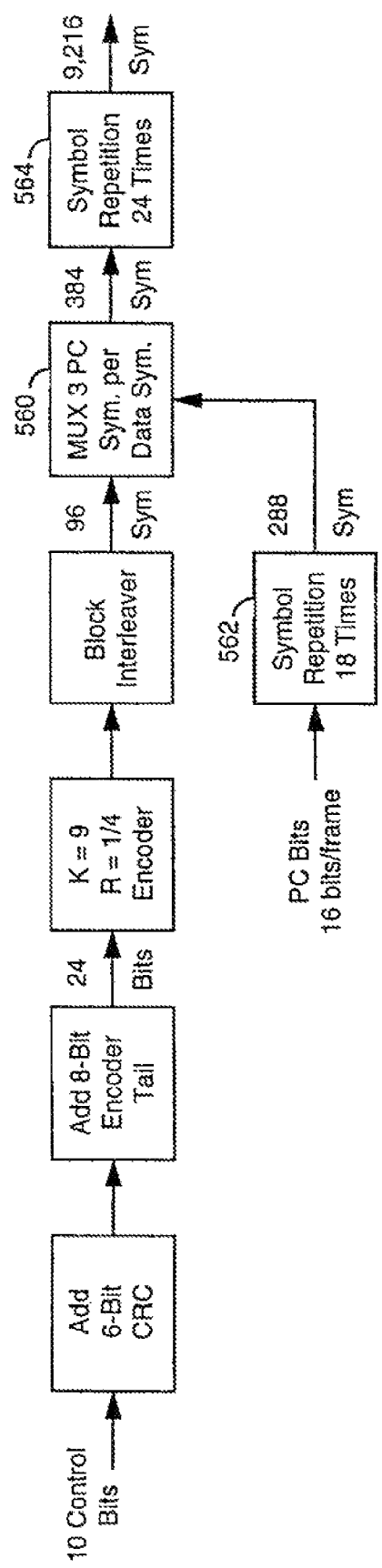
FIG. 14 is a block diagram of the coding performed for the control channel when configured in accordance with one embodiment of the invention.

FIG. 14 is a block diagram of the processing performed for the control channel for a 3.6864 MHz spreading bandwidth system. The processing is substantially similar to that associated with the other channels, except for the addition of a mux 560 and symbol repeater 562, which operate to introduce uncoded power control bits into the code symbol stream. The power control bits are generated at a rate of 16 per frame, and repeated 18 times by symbol repeater 562 resulting in 288 power control bits per frame. The 288 power control bits are multiplexed into the frame of code symbols at a ratio of three power control bits per coded data symbol, generating 384 total symbols per frame. Symbol repeater 564 repeats the 384 bits 24 times generating 9,216 symbols per frame for an effective data rate of 500 kbits/second for the control data, and 800 kbits/second for the power control bits. The preferred processing performed for a 1.2288 MHz bandwidth system simply reduces the number of symbol repetitions performed from 24 to 8.

Thus, a multi-channel, high rate, CDMA wireless communication system has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for generating data for transmission from a subscriber unit to a base station, the method comprising:
modulating each of a plurality of channel encoded data with an associated code to produce a plurality of streams of modulated symbols, wherein the code associated with one of the plurality of channel encoded data has a longer length than the code associated with another one of the plurality of channel encoded data;
combining the plurality of streams of modulated symbols and pilot channel data into two combined streams to reduce a peak-to-average ratio of the transmission; and
complex multiplying said two combined streams with a complex pseudonoise code.

2. The method as claimed in claim 1, wherein the modulating each of the plurality of channel encoded data with the associated code comprises:
   modulating a user first channel encoded data with a first code to produce a first stream of modulated symbols; and
   modulating a user second channel encoded data with a second code to produce a second stream of modulated symbols.

3. The method as claimed in claim 2, wherein said combining the plurality of streams of modulated symbols and the pilot channel data comprises:
   separately providing said first stream of modulated symbols and said second stream of modulated symbols for said complex multiplying.

4. The method as claimed in claim 2, wherein said combining the plurality of streams of modulated symbols and the pilot channel data comprises:
   adding the first stream of modulated symbols to the pilot channel data to provide a first added stream of modulated symbols; and
   separately providing said first added stream of modulated symbols and a second added stream of modulated symbols for said complex multiplying.

5. The method as claimed in claim 2, wherein the modulating each of the plurality of channel encoded data with the associated code further comprises:
   modulating a control channel encoded data with a third code to produce a third stream of modulated symbols.

6. The method as claimed in claim 5, wherein said combining the plurality of streams of modulated symbols and the pilot channel data comprises:
   adding the first stream of modulated symbols to the pilot channel data to provide a first added stream of modulated symbols;
   adding the second stream of modulated symbols to the third stream of modulated symbols to provide a second added stream of modulated symbols; and
   separately providing said first added stream of modulated symbols and the second added stream of modulated symbols for said complex multiplying.

7. The method as claimed in claim 2, wherein the length of the first code is greater than the length of the second code.

8. The method as claimed in claim 1 wherein the complex pseudonoise code comprises an in-phase pseudonoise code component and a quadrature-phase pseudonoise code component.

9. The method as claimed in claim 8 wherein each of the in-phase pseudonoise code component and the quadrature-phase pseudonoise code component is multiplied by a long code.

10. The method as claimed in claim 1 wherein said complex multiplying comprises:
    using a first of at least one of the two combined streams and an in-phase pseudonoise code component as real parts; and
    using a second of at least one of the two combined streams and a quadrature-phase pseudonoise code component as imaginary parts.

11. The method as claimed in claim 10 wherein said complex multiplying further comprises:
    multiplying a first of the two combined streams by the in-phase pseudonoise code component to produce a first intermediate signal;
    multiplying a second of the two combined streams by the in-phase pseudonoise code component to produce a second intermediate signal;
    multiplying the first of the two combined streams by the quadrature-phase pseudonoise code component to produce a third intermediate signal;
    multiplying the second of the two combined streams by the quadrature-phase pseudonoise code component to produce a fourth intermediate signal;
    subtracting the fourth intermediate signal from the first intermediate signal to produce an in-phase product signal; and
    adding the second intermediate signal to the third intermediate signal to produce a quadrature-phase product signal.

12. The method as claimed in claim 1, wherein the codes associated with the plurality of streams of modulated symbols comprise Walsh codes.

13. The method as claimed in claim 1, further comprising:
    adjusting the gains of the plurality of streams of modulated symbols.

14. The method as claimed in claim 13, wherein said adjusting the gains of the plurality of streams of modulated symbols comprises:
    adjusting the gain of a first stream of the plurality of streams of modulated symbols; and
    adjusting the gains of each of the remaining streams of the plurality of streams of modulated symbols.

15. An apparatus for generating data for transmission from a subscriber unit to a base station, the apparatus comprising:
    a plurality of modulators configured to modulate each of a plurality of channel encoded data with an associated code to produce a plurality of streams of modulated symbols, wherein the code associated with one of the plurality of channel encoded data has a longer length than the code associated with another one of the plurality of channel encoded data;
    a combiner, communicatively coupled to said plurality of modulators, configured to combine the plurality of streams of modulated symbols and pilot channel data into two combined streams to reduce a peak-to-average ratio of the transmission; and
    a complex multiplier, communicatively coupled to said combiner, configured to complex multiply said two combined streams with a complex pseudonoise code.

16. The apparatus as claimed in claim 15, wherein said plurality of modulators comprises:
    a first modulator configured to modulate a user first channel encoded data with a first code to produce a first stream of modulated symbols; and
    a second modulator configured to modulate a user second channel encoded data with a second code to produce a second stream of modulated symbols.

17. The apparatus as claimed in claim 16, wherein said combiner comprises:
    a first adder configured to add the first stream of modulated symbols and the pilot channel data to provide a first combined stream; and
    a second adder configured to add the second stream of modulated symbols to a third stream of the plurality of streams of modulated symbols to provide a second combined stream.

18. The apparatus as claimed in claim 16, wherein said plurality of modulators further comprises:
    a third modulator configured to modulate a control channel encoded data with a third code to produce a third stream of modulated symbols.

19. The apparatus as claimed in claim 18, wherein said combiner comprises:

a first adder configured to add the pilot channel data to the first stream of modulated symbols to provide a first combined stream; and a second adder configured to add the third stream of modulated symbols to the second stream of modulated symbols to provide a second combined stream.

20. The apparatus as claimed in claim 16, wherein the length of the first code is greater than the length of the second code.

21. The apparatus as claimed in claim 15 wherein the complex pseudonoise code comprises an in-phase pseudonoise code component and a quadrature-phase pseudonoise code component.

22. The apparatus as claimed in claim 21 wherein each of the in-phase pseudonoise code component and the quadrature-phase pseudonoise code component is multiplied by a long code.

23. The apparatus as claimed in claim 15 wherein said complex multiplier is configured to:

use a first of at least one of the two combined streams and an in-phase pseudonoise code component as real parts: and use a second of at least one of the two combined streams and a quadrature-phase pseudonoise code component as imaginary parts.

24. The apparatus as claimed in claim 23 wherein said complex multiplier comprises:

a first multiplier configured to multiply a first of the two combined streams by the in-phase pseudonoise code component to produce a first intermediate signal;

a second multiplier configured to multiply a second of the two combined streams by the in-phase pseudonoise code component to produce a second intermediate signal;

a third multiplier configured to multiply the first of the two combined streams by the quadrature-phase pseudonoise code component to produce a third intermediate signal;

a fourth multiplier configured to multiply the second of the two combined streams by the quadrature-phase pseudonoise code component to produce a fourth intermediate signal;

a first adder configured to subtract the fourth intermediate signal from the first intermediate signal to produce an in-phase product signal; and a second adder configured to add the second intermediate signal to the third intermediate signal to produce a quadrature-phase product signal.

25. The apparatus as claimed in claim 15, wherein the codes associated with the plurality of streams of modulated symbols comprise Walsh codes.

26. The apparatus as claimed in claim 15, further comprising:

a plurality of gain adjusters configured to adjusting the gains of the plurality of streams of modulated symbols.

27. The apparatus as claimed in claim 26, wherein said plurality of gain adjusters comprises:

a first gain adjuster configured to adjust the gain of a first stream of the plurality of streams of modulated symbols; and a second plurality of gain adjusters configured to adjust the gains of each of the remaining streams of the plurality of streams of modulated symbols.

\* \* \* \* \*